(12) United States Patent
Tariq et al.

(10) Patent No.: US 9,617,190 B2
(45) Date of Patent: Apr. 11, 2017

(54) BIOACTIVE NUTRIENT FORTIFIED FERTILIZERS AND RELATED METHODS

(71) Applicant: NIHA CORP., Ontario, CA (US)

(72) Inventors: Nadeem Tariq, Lahore (PK);
Muhammed Arshad, Multan (PK);
Hamad Raza Jamshed, Multan (PK);
Nasim Ahmed, Rancho Cucamonga, CA (US)

(73) Assignee: NIHA CORP., Ontario (CA)

( * ) Notice: Subject to any disclaimer, the term of this patent is extended or adjusted under 35 U.S.C. 154(b) by 0 days.

(21) Appl. No.: 14/688,241

(22) Filed: Apr. 16, 2015

(65) Prior Publication Data

US 2015/0299055 A1 Oct. 22, 2015

Related U.S. Application Data

(63) Continuation-in-part of application No. 14/561,039, filed on Dec. 4, 2014, now Pat. No. 9,353,016, which is a continuation of application No. 13/789,407, filed on Mar. 7, 2013, now Pat. No. 8,932,382.

(60) Provisional application No. 61/651,196, filed on May 24, 2012.

(51) Int. Cl.
*C05F 11/08* (2006.01)
*C05G 3/00* (2006.01)
*C05B 15/00* (2006.01)
*C05D 9/00* (2006.01)
*C05F 9/04* (2006.01)

(52) U.S. Cl.
CPC .......... *C05B 15/00* (2013.01); *C05D 9/00* (2013.01); *C05F 9/04* (2013.01); *C05G 3/0041* (2013.01); *Y02P 20/145* (2015.11)

(58) Field of Classification Search
None
See application file for complete search history.

(56) References Cited

U.S. PATENT DOCUMENTS

| | | |
|---|---|---|
| 3,186,826 A | 6/1965 | Del Muro de Rendon |
| 4,589,225 A | 5/1986 | Stensaas |
| 5,147,441 A | 9/1992 | Megeed |
| 5,578,486 A | 11/1996 | Zhang |
| 5,912,398 A | 6/1999 | Goldstein et al. |
| 8,066,793 B2 | 11/2011 | Sinclair |

(Continued)

FOREIGN PATENT DOCUMENTS

| | | |
|---|---|---|
| WO | WO 2010/018210 | 2/2010 |
| WO | WO 2012/038740 | 3/2012 |

OTHER PUBLICATIONS

Ahmad, R., et al., "Growth and Yield Response of Wheat (*Triticum aestivum* L.) and Maize (*Zea mays* L.) to Nitrogen and L-Tryptophan Enriched Compost", Pak. J. Bot., 2007, vol. 39, No. 2, pp. 541-549.

(Continued)

*Primary Examiner* — Wayne Langel
(74) *Attorney, Agent, or Firm* — One LLP

(57) ABSTRACT

A fertilizer and method of making a fertilizer that include bioactivated nutrients derived from immobile/less mobile elements. The immobile/less elements are made available to plants by the action of element mobilizing microorganisms, which are isolated, cultured, and combined with organic material and sources of the immobile element.

5 Claims, 14 Drawing Sheets

(56) References Cited

U.S. PATENT DOCUMENTS

| | | | |
|---|---|---|---|
| 8,530,220 | B2 | 9/2013 | Ho et al. |
| 8,764,873 | B2* | 7/2014 | Nevin ............... C05C 9/005 71/15 |
| 2005/0039509 | A1 | 2/2005 | Muma |
| 2007/0131009 | A1* | 6/2007 | Westbrook ............ C05F 11/08 71/6 |
| 2008/0216534 | A1 | 9/2008 | Karr |
| 2008/0257000 | A1 | 10/2008 | McMahon et al. |
| 2010/0234222 | A1 | 9/2010 | Gidekel et al. |
| 2011/0100078 | A1 | 5/2011 | Ho et al. |
| 2011/0283759 | A1* | 11/2011 | Cisneros ............. C05D 3/02 71/21 |
| 2014/0352376 | A1* | 12/2014 | Carpenter ............ C05B 17/00 71/6 |

OTHER PUBLICATIONS

Ahmad, R., et al., "Bio-conversion of organic wastes for their recycling in agriculture: An overview of perspectives and prospects", Annals of Microbiology, 2007, vol. 57, No. 4, pp. 1-10.

Ahmad, R., et al., "Effectiveness of Organic-/Bio-Fertilizer Supplemented with Chemical Fertilizers for Improving Soil Water Retention, Aggregate Stability, Growth and Nutrient Uptake of Maize (*Zea mays* L.)", Journal of Sustainable Agriculture, 2008, vol. 31, No. 4, pp. 57-77.

Aziz, T., et al., "Phosphorus Utilization by Six Brassica Cultivars (*Brassica juncea* L.) From Tri-Calcium Phosphate; A Relatively Insoluble P Compound", Pak. J. Bot., 2006, vol. 38, No. 5, pp. 1529-1538.

Bhattacharyya, P., et al., "Municipal waste compost as an alternative to cattle manure for supplying potassium to lowland rice", Chemosphere, 2007, vol. 66, pp. 1789-1793.

Bojinova, D., et al., "Solubilization of Morocco phosphorite by *Aspergillus niger*", Bioresource Technology, 2008, vol. 99, pp. 7348-7353.

WO, PCT/US2013/033005 ISR, Jul. 15, 2013.

WO, PCT/US2013/033005 IPRP, Nov. 25, 2014.

Caravaca, F., et al., "Comparing the effectiveness of mycorrhizal inoculation and amendment with sugar beet, rock phosphate and *Aspergillus niger* to enhance field performance of the leguminous shrub *Dorycnium pentaphyllum* L.", Applied Soil Ecology, 2004, vol. 25, pp. 169-180.

Dastager, S. G., et al., "Isolation and characterization of novel plant growth promoting *Micrococcus* sp NII-0909 and its interaction with cowpea", Plant Physiol. Biochem., 2010, vol. 48, No. 12, pp. 987-992.

Dworkin, M., et al., "Experiments With Some Microorganisms Which Utilize Ethane and Hydrogen", Utilization of Ethane and Hydrogen, 1958, vol. 75, pp. 592-603.

Gupta, A., et al., "Role of Biofertilizers and Biopesticides for Sustainable Agriculture", 2012, Department of Biotechnology, Singhania University, Rajasthan.

Gyaneshwar, P., et al., "Effect of buffering on the phosphate-solubilizing ability of microorganisms", World Journal of Microbiology & Biotechnology, 1998, vol. 14, pp. 669-673.

Hamza, M. A., et al., "Potential and limitations of soil organic matter build-up in dry areas", African Journal of Agricultural Research, 2010, vol. 5, No. 20, pp. 2850-2861.

Harris, J. N., et al., "Laboratory tests can predict beneficial effects of phosphate-solubilising bacteria on plants", Soil Biology & Biochemistry, 2006, vol. 38, pp. 1521-1526.

Isherwood, K.F., "Mineral Fertilizer Use and the Environment", International Fertilizer Industry Association, 2000, Paris, pp. 1-52.

Kennedy, A.C., et al., "Soil microbial diversity and the sustainability of agricuktural soils", Plant and Soil, 1995, vol. 170, pp. 75-86.

Khan, M. S., et al., "Synergistic Effects of the Inoculation with Plant Growth-Promoting Rhizobacteria and an Arbuscular Mycorrhizal Fungus on the Performance of Wheat", Turk. J. Agric. For., 2007, vol. 31, pp. 355-362.

Khan, A. A., et al., "Phosphorus Solubilizing Bacteria: Occurrence, Mechanisms and their Role in Crop Production", J. Agric. Biol. Sci., 2009, vol. 1, No. 1, pp. 48-58.

López-Bucio, J., et al., "The role of nutrient availability in regulating root architecture", Current Opinion in Plant Biology, 2003, vol. 6, pp. 280-287.

Mahdi, S. S., et al., "Bio-Fertilizers in Organic Agriculture", Journal of Phytology, 2010, vol. 2, No. 10, pp. 42-54.

Malboobi, M.A., et al., "Solubilization of organic and inorganic phosphates by three highly efficient soil bacterial isolates", World J. Microbiol. Biotechnol., 2009, vol. 25, No. 8, pp. 1471-1477.

Manzar-Ul-Alam, S., et al., "Evaluation of method and time of fertilizer application for yield and optimum P-efficiency in wheat", Songklanakarin J. Sci. Technol., 2005, vol. 27, No. 3, pp. 457-463.

Mullins, G., "Phosphorus, Agriculture & The Environment", Virginia Polytechnic Institute and State University, 2009, Publication 424-029, pp. 1-16.

Nautiyal, C. S., "An efficient microbiological growth medium for screening phosphate solubilizing microorganisms", FEMS Microbiology Letters, 1999, vol. 170, pp. 265-270.

Penrose, D. M., et al., "Methods for isolating and characterizing ACC deaminase-containing plant growth-promoting rhizobacteria", Physiologia Plantarum, 2003, vol. 118, pp. 10-15.

Rodríguez, H., et al., "Phosphate solubilizing bacteria and their role in plant growth promotion", Biotechnology Advances, 1999, vol. 17, pp. 319-339.

Ryan, J., et al., "Soil and Plant Analysis Laboratory Manual, Second Edition, Table of Contents", 2001, ICARDA, pp. 1-5.

Schachtman, D. P., et al., "Phosphorus Uptake by Plants: From Soil to Cell", Plant Physiol., 1998, vol. 116, pp. 447-453.

Semêdo, L.T.A.S., et al., "Isolation and characterization of actinomycetes from Brazilian tropical soils", Microbiol. Res., 2001, vol. 155, pp. 291-299.

Shaharoona, B., et al., "Fertilizer-dependent efficiency of Pseudomonads for improving growth, yield, and nutrient use efficiency of wheat (*Triticum aestivum* L.)", Appl. Microbiol. Biotechnol., 2008, vol. 79, pp. 147-155.

Shahzad, S.M., et al., "Screening rhizobacteria containing ACC-deaminase for growth promotion of chickpea seedlings under axenic conditions", Soil & Environ., 2010, vol. 29, No. 1, pp. 38-46.

Sekhar, D.M.R., et al., "Phosphate rock with farmyard manure as P fertilizer in neutral and weakly alkaline soils", Current Science, 2001, vol. 80, No. 9, pp. 1113-1115.

Shenoy, V.V., et al., "Enhancing plant phosphorus use efficiency for sustainable cropping", Biotechnology Advances, 2005, vol. 23, pp. 501-513.

Takahashi, S., et al., "Wheat grain yield, phosphorus uptake and soil phosphorus fraction after 23 years of annual fertilizer application to an Andosol", Field Crops Research, 2007, vol. 101, pp. 160-171.

Vance, C. P., et al., "Symbiotic Nitrogen Fixation and Phosphorus Acquisition. Plant Nutrition in a World of Declining Renewable Resources", Plant Physiology, 2001, vol. 127, pp. 390-397.

Vance, C. P., et al., "Phosphorus acquisition and use: critical adaptations by plants for securing a nonrenewable resource", New Phytologist, 2003, vol. 157, pp. 423-447.

Van Straaten, P., "Rocks for Crops: Agrominerals of sub-Saharan Africa", 2002, ICRAF, Nairobi, Kenya, pp. 1-348.

Vassilev, N., et al., "Biotechnological solubilization of rock phosphate on media containing agro-industrial wastes", Appl. Microbiol. Biotechnol., 2003, vol. 61, pp. 435-440.

Walpola, B. C., et al., "Prospectus of phosphate solubilizing microorganisms and phosphorus availability in agricultural soils: A review", African Journal of Microbiology Research, 2012, vol. 6, No. 37, pp. 6600-6605.

Williamson, L.C., et al., "Phosphate Availability Regulates Root System Architecture in Arabidopsis", Plant Physiology, 2001, vol. 126, pp. 875-882.

"Environmental, Health and Safety Guidelines for Phosphate Fertilizer Manufacturing", International Finance Corporation, World Bank Group Report, 2007, pp. 1-20.

Zou, X., et al., "A new method for estimating gross phosphorus mineralization and immobilization rates in soils", Plant and Soil, 1992, vol. 147, pp. 243-250.

(56) References Cited

OTHER PUBLICATIONS

Zuberer, D. A., et al., "Recovery and Enumeration of Viable Bacteria", Methods of Soil Analysis, Part 2. Microbiological and Biochemical Properties—SSSA Book Series, No. 5, Chapter 8, 1994, pp. 119-144.

* cited by examiner

| Media 1 for F1 breeding for 100 mL [of PSM and PGRM] |                |           |             |
| ---------------------------------------------------- | -------------- | --------- | ----------- |
| 160                                                  |                |           |             |
| Ingredients                                      |                |           |             |
| Mannitol                                             | 3–4 g          | $KH_2PO_4$ | 0.1–0.13 g  |
| Yeast Extract                                        | 0.3–0.7 g      | $MgSO_4$  | 0.1–0.13 g  |
| Distilled water                                      | 100 ml         |           |             |
| Preparation Techniques                           |                |           |             |
| Prepare the same medium in two separate containers for PSM and PGRM. Maintain pH between 6.0 – 7.5. Adjust pH by adding 1M solution of either $H_2SO_4$ or NaOH. Autoclave the mixture in both containers as per standard procedure then allowing the mixtures to cool to mesophillic range maintaining pH close to neutral level. Mix selected strains of PSM and PGRM in respective containers under aseptic conditions. Shaking should be done by continues shaking on an orbital shaker. Desired population should be achieved in 50 to 96 hours. ||||

FIGURE 3

| Media for commercial production [of PSM and PGRM] 170 | | | |
|---|---|---|---|
| Ingredients | | | |
| Trypton | 15-20 g | Calcium Pantothinate | 0.1-0.15 g |
| Yeast extract | 4-7g | Vitamin B1 | 0.3-0.7 mL |
| $KH_2PO_4$ | 0.15-0.2 g | Vitamin B12 | 0.3-0.7 mL |
| $MgSO_4$ | 0.3-0.7 g | Distil water | 1 Liter |

Preparation Techniques

Prepare same medium in two separate containers for PSM and PGRM. Maintain pH between 6.0 – 7.5. Adjust pH by adding 1M solution of either $H_2SO_4$ or NaOH. Autoclave the mixture in both containers as per standard procedure then allowing the mixtures to cool to mesophillic range maintaining pH close to neutral level. Mix selected strains of PSM and PGRM in respective containers under aseptic conditions. Shaking should be done by continues aeration. Desired population is achieved in 50-96 hours.

FIGURE 4

BIOACTIVE NUTRIENT FORTIFIED FERTILIZERS AND RELATED METHODS

RELATED APPLICATIONS

This application is a continuation-in-part of U.S. patent application Ser. No. 14/561,039, filed Dec. 4, 2014, which is a continuation of U.S. patent application Ser. No. 13/789,407, filed Mar. 7, 2013, now U.S. Pat. No. 8,932,382, which claims the benefit of U.S. Provisional Application No. 61/651,196, filed May 24, 2012, all of which are hereby incorporated by reference.

TECHNICAL FIELD

This invention relates generally to the field of production of bioactivated fertilizers. More particularly, this invention relates to the field of isolation, screening, and optimization of element mobilizing microorganisms (EMM) wherein the EMM are incorporated into an organic matter powder to enhance the mobility of immobile or less mobile target nutrient elements upon blending/mixing with highly divided fine particles containing the target nutrient elements to facilitate bioavailability for improved growth.

BACKGROUND

I. The Problem with Sub-Optimal Use of Phosphatic Fertilizers.

Phosphorus (P) is an important nutrient required for plant growth and development, making up 0.2% of plants on dry weight basis. (Vance, 2001; Sachachtman, et al., 1998.) It is a significant part of a plant's physiological and biochemical activities, such as photosynthesis, carbon metabolism, membrane formation, energy generation, nucleic acid synthesis, glycolysis, respiration, enzyme activation/inactivation and nitrogen fixation. (Bucio, et al., 2003.)

Plants absorb most of their phosphorus as the primary orthophosphate ion ($H_2PO_4^{-2}$) and a smaller amount from the secondary orthophosphate ion ($HPO_4^{2-}$). Plants also absorb certain soluble organic phosphates (i.e. $PO_4^{3-}$ in nucleic acid and phytic acid). (Sekhar and Aery, 2001; Mullins, 2009.)

Amongst a number of advantages, the addition of phosphorus creates deeper and more abundant plant roots. (Gupta and Sen, 2012.) Conversely, a phosphorus deficiency alters root architecture, which ultimately affects seed development and normal crop maturity. (Williamson, et al., 2001.) Thus, the availability of adequate phosphorus is fundamental to stimulate early plant growth and hasten maturity.

However, phosphorus is among the least bio-available nutrients in soil (Takahashi and Anwar, 2007.) While the total amount of phosphorus is 0.05% of soil content on average, only 0.1% of that amount is available to plants. (Zou, et al., 1992.) Even in fertile soils less than 10 μM is available at pH 6.5 where it is the most soluble. (Gyaneshwar, et al., 1998.)

Soil phosphorus is found in both organic and mineral pools. Twenty percent (20%) to eighty percent (80%) of soil phosphorus is found in an organic form, such as phytic acid, while the rest of phosphorus is found as inorganic fraction. (Sachachtman, et al., 1998.) Because most arid and semi-arid soil regimes are deficient in phosphorus, phosphatic fertilizers are required to replenish the phosphorus demanded by crop plants.

However, more than 80% of the phosphorus applied as fertilizer stagnates in an immobile pool due to the presence of iron (Fe) and aluminum (Al) in acidic soils, and calcium (Ca) in neutral and alkaline soils, resulting in insolubilization, precipitation, and adsorption or conversion into an organic form through biological activities. (Harris, et al., 2006.) This so called "fixation" of externally supplied phosphorus is common in arid alkaline and calcareous soils because of the higher activity of the calcium. And when coupled with a high pH typically found in soils, the application of externally supplied phosphorus favors the precipitation of relatively insoluble di-calcium phosphate and other basic calcium phosphates such as hydroxyl-apatite and carbonato-apatite decreasing the activity of phosphorus. Research suggests that phosphorus "fixation" in alkaline soils is largely attributed to the retention by clays saturated with calcium. Because calcium ions can retain greater amount of phosphorus than those saturated with sodium or other mono-violent ions, the formation of clay ($Ca^{2+}$ $H_2PO_4^{2-}$) is believed to be the most likely culprit.

Low availability of phosphorus to crop plants is a worldwide problem and thus crop yield on 30 to 40% of world's arable land is limited by phosphorus availability. (Vance, et al., 2003.)

To overcome the consistent deficiency of phosphorus in alkaline/calcareous soils, soluble phosphatic fertilizers are applied to agricultural fields to maximize crop production. (Shenoy and Kalagudi, 2005.) Commercial fertilizers have played a very significant role in enhancing the per acre yield of crops and in return feeding the rising population of the world.

Unfortunately, however, current production of phosphorus fertilizers is insufficient to meet rising demand. The alarming depletion of world resources of rock phosphate, along with their low use efficiency, has resulted in consistently increasing prices of phosphorus fertilizers. Elevated fertilizer prices, their scarcity at the right time of application, as well as sub-optimal doses largely accounts for low phosphorus fertilizers use. (Alam, et al., 2005.) In addition to these problems, the fixation/precipitation/adsorption/transformation of phosphorus decreases efficiency of applied chemical phosphorus fertilizers. Such sub-optimal use of phosphate fertilizers has led to exogenous application of substantial quantities of phosphatic fertilizers in agricultural fields. (Vassilev and Vassileva, 2003; Aziz, et al., 2006.)

Accordingly, improved supply of organic phosphate, which not only supply soluble organic phosphates, but also release substantial amount of phosphorus through microbial mineralization of organically bound phosphorus, would be highly desirable.

II. Current Limitations With Production Of Fertilizers And Inefficient Use.

Rock phosphate (RP) is a basic raw material used for manufacturing of chemical phosphatic fertilizer. Globally, there are four major types of phosphate resources in the world, including marine, igneous, metamorphic, and biogenic phosphate deposits which contain either of the fluor-apatite ($Ca_{10}(PO_4)_6F_2$), hydroxy-apatite ($Ca_{10}(PO_4)_6(OH)_2$), carbonate-hydroxy-apatite ($Ca_{10}(PO_4CO_3)_6(OH)_2$), francolite, dahllite, and collophane compounds. (Straaten, 2002.) Reserves are primarily found in Northern Africa, China, the Middle East, United States, Brazil, Canada, Finland, Russia, and South Africa. Large phosphate resources have also been identified on the continental shelves and on seamounts in the Atlantic and the Pacific Ocean. World rock phosphate reserves are more than 300 billion tons, while annual consumption in 2011 was 191 million tons, up 20% from 2010.

The desired grade of rock phosphate for manufacturing classic chemical fertilizers is one having 30% $P_2O_5$ or higher, with low silica, magnesium, and other elements. Reserves of these grades are declining. A number of physiochemical processes are employed to improve $P_2O_5$ content of low-grade rock phosphate and to remove undesired elements. Physical and thermal up-gradation of rock phosphate is achieved through crushing and screening, scrubbing, de-sliming, flotation, and magnetic and gravitation separation. However, a substantial amount of energy is consumed and environmental pollutants are released in these processes.

Rock phosphate shows a considerable proportion of isomorphic substitution in the crystal lattice and has a variable proportion and amounts of accessory minerals and impurities. Research shows that rock phosphates are appropriate for direct use in acidic soils for the supply of available phosphorus, but are unsuitable for neutral to alkaline soils. (Sekhar and Aery, 2001.) Thus, the release of bioavailable phosphorus from insoluble phosphates in alkaline/calcareous soil is important for sustainable agriculture by mobilizing its phosphorus through a variety of advanced approaches where an inert phosphorus source is predictable, and can be rehabilitated into plant available form. (Kennedy and Smith, 1995; Caravaca, et al., 2004.)

In addition to phosphorous problems, depleted organic matter reserves of arid alkaline/calcareous soils further decrease crop production, as well as affect numerous soil metabolic processes. (Mullins, 2009.) Most organic matter decomposes quickly when applied in a hot arid climate, which explains why arid soils are poor in organic matter. But, organic matter is a universal remedy and is known to improve soil health and availability of nutrients to plant. Most organic wastes are a potential source of plant macronutrients as well as a large quantity of micronutrients. However, it is difficult to increase the organic matter content of soils that are well aerated, such as in coarse sands and soils in warm-hot and arid regions, because added materials decompose rapidly. (Hamza and Anderson, 2010.)

Generally, arid climate tends to enhance microbial decomposition of organic matter, and such soils are low in organic carbon. When any inoculum or microorganism cells are added to those soils, their population typically do not reach a level at which they can perform efficiently. In many cases, they do not survive long, often resulting in inconsistent performance. This situation alarmingly needs restoration of organic matter through exogenous application. But unlike chemical fertilizers, these organic amendments are not that rich in nutrients, particularly in phosphorus. Therefore, after the introduction of chemical fertilizers and high yielding varieties in cropping system, farmers are largely dependent on continuous injection of chemical fertilizers to meet high plant nutrient requirements.

But, the use of organic waste and chemical fertilizers not only requires constant replenishment (with significant resources to create), but they are also a source of pollution, requiring additional management for short term and long term environmental impacts. Organic waste management is a major environmental issue because constant population growth means commensurately more waste to be recycled. Likewise, chemical fertilizer manufacturing is known to generate a wide range of air emissions, hazardous materials, effluents, waste water, and other harmful byproducts are generated (e.g. hydrofluoric acid, silicon, tetrafluoride, fluoride, $SO_4$ phospho-gypsum, $NH_4$, $NO_x$ fluoride air, $P_2O_5$ effluents, dust fluoride effluents, chloride, cadmium, lead, radionuclides, and sulfur compounds, etc.). Further, chemical fertilizer manufacturing also consumes substantial energy, ranging from 120 to 450 KWh per ton of $P_2O_5$, depending on the process employed. Moreover, chemical fertilizer manufacturing consumes substantial amounts of water, ranging from 2 to 150 cubic meters per ton of $P_2O_5$, depending on the process employed. (UNEP Technical report, 1996; World Bank Group report, 2007.)

As the worldwide population grows, and the need for agricultural farming using organic waste and chemical fertilizers increase, recycling organic wastes is quickly becoming a major environmental issue. Composting organic residues is believed to be the best possible means to recycle. Using composted products improves soil properties, and in turn improves soil productivity, thus promoting the plant growth. (Vassilev and Vassileva, 2003.)

Thus, the efficient use of organic fertilizers is a key strategy not only for improving soil organic matter content and nutrients supply but also for reducing the input cost of mineral fertilizers and promoting healthier environment. (Bhattacharyya, et al., 2007; Ahmad, et al., 2007a.)

Organic approaches that partially supplement nutrients through organic sources (and which do not involve synthetic formulation) have gained considerable positive response during recent years. However, under the current hegemony of organic fertilizer practitioners, and because of accelerated decomposition, the use of organic materials remain poor in nutrient content and does not completely fulfill nutritional needs of crops, particularly phosphorus, for normal growth and yields. (Ahmad, et al., 2007b.)

However, lab research suggests that organic fertilizers can be used as rich carriers of plant growth promoting rhizobacteria that not only mobilize nutrients in soils but also facilitate nutrient uptake of less mobile nutrients, such as phosphorous, by altering root architecture. These synergistic effects benefit crops tremendously. (Shahroona, et al., 2008.) And novel plant growth promoting rhizobacteria (PGPR) isolates show promising attributes when developed and used as bio-fertilizers to enhance soil fertility and promote plant growth. (Dastgeer, 2010.)

However, a consistently lacking element in the use of PGPR isolates is the ability to consistently deliver the "right type" of bacteria that plays the appropriate role in phosphorus nutrition. Unless one consistently delivers the "right type" of bacteria that solubilize/mineralize inorganic and organic soils, such delivery cannot enhance phosphorous availability to plants. (Ahmad, et al., 2009; Walpola and Yoon, 2012.)

Based in part on the hegemony of current organic fertilizer users, and based on sparse research available on cultivating PGPR isolates, let alone those that are augmented with phosphate solubilizing microorganisms (PSM) or plant growth regulating microorganisms (PGRM) including, but not restricted to, prokaryotes such as algae, bacteria, protozoa, etc., and eukaryotes such as fungi, etc.; there exists a void in the industry as to the large scale production of bio-organo-phosphate (BOP) fertilizer using these technologies.

Accordingly, improved efficacy due to less probability of fixation, precipitation, or insolubilization than current commercial soluble chemical/inorganic fertilizers is desired. In addition, the environmentally conscious production, application, and management of organic fertilizers are likewise desirable. In sum, there exists a long-felt industry need for the large-scale production of bio-organo-phosphate (BOP) fertilizer that consistently and optimally delivers phosphorous to plants to help improve root architecture, enhance nutrient uptake, accelerate healthy growth, and hasten maturity.

III. Bioavailability of Immobile/Less Mobile Nutrient Elements.

Agriculture has been providing food, feed, and shelter to global populations. Land use for agriculture is 38% of 13 billion hectares worldwide with 2.9% contribution to global GDP. According to 2020 projections, agriculture will be challenged to supply an increasing population, especially in developing countries. Fertilizers that contain both macro- and micronutrients are considered the most important input for sustainable crop production with an approximate increase of 25% in yield and productivity through their use. Both macro- and micronutrients play a critical role in overall agricultural productivity enhancement. Macronutrients of immobile/less mobile elements, such as phosphorus, and the majority of such micronutrients including, but not limited to, zinc, iron, boron, and manganese, are increasingly becoming a limiting factor in obtaining optimum crop productivity. It has been found that deficiency in some macronutrients and micronutrients affects the ability of plants to effectively uptake and use other mobile and immobile nutrients already present in the soil. In particular, zinc deficiency has recently been reported in a variety of crops. Zinc is also critical for human health. Its deficiency in humans may lead to compromised immunity, hair loss, skin lesions, loss of appetite, diarrhea, loss of taste and smell, and many other disorders. It is widely accepted that the best source of micronutrient supply to humans is through agricultural products. Therefore, micronutrient fortified crops, such as zinc-fortified crops, are an excellent source of nutritional balance for human beings.

Immobile/less mobile macro- and micronutrients are taken up by plants continuously from emergence to maturity. A variety of products containing immobile/less mobile nutrients are available in the market, however, application methods to target crops do not support sufficient availability of these nutrient elements to fulfill a plant's requirements throughout the entire crop cycle. For instance, uptake of zinc by crops is very low compared to the quantity applied. More than 90% of the applied zinc remains in non-available forms in the soil, particularly in alkaline soil, resulting in financial losses to farmers due to nutrient deficiency in plants and in lower yields. It has been documented that only 4-8% of the applied zinc is being utilized by the target crop in alkaline soils. Zinc deficiency also affects the plant's efficient use of other mobile and immobile/less mobile elements, even though these elements are sufficiently available in the soil, thus affecting agricultural productivity and the cost-benefit ratio of all nutrients for farmers.

A wide variety of commercial fertilizer products containing immobile/less mobile nutrient elements are available in the market. However, these either have low efficacy or are not suitable for all types of crops and soils. For instance, phosphorus use efficiency is around 20-25% and zinc use efficiency ranges between 4-8%. In addition, market availability of products including zinc and other micronutrients in a form readily available to crops is yet another crucial factor that is seriously affecting farmers' ability to enhance productivity.

Accordingly, there is a need to develop an effective fertilizer to enhance bioavailability of immobile/less mobile macro- and micronutrients in order to reduce losses and improve agricultural productivity.

SUMMARY

One exemplary embodiment is a method of producing bioactivated fortified fertilizer. The method includes the steps of providing a fertilizer, providing a material rich in a target nutrient element, preparing bioaugmented organic matter, preparing bioactive micronutrient from the bioaugmented organic matter and the material rich in a target micronutrient element, and coating the fertilizer with the bioactive micronutrient to form bioactivated nutrient fortified fertilizer containing both macro- and micronutrients.

In more detailed features of an exemplary embodiment, the step of preparing bioaugmented organic matter includes the steps of preparing organic matter, isolating EMM capable of mobilizing the target nutrient element, growing the EMM to prepare a culture, inoculating the organic matter with a portion of the culture, and incubating the inoculated organic matter to generate the bioaugmented organic matter having a predetermined population of the EMM.

In other, more detailed features of an exemplary embodiment, the step of preparing the bioactive nutrient includes the steps of blending the bioaugmented organic matter and the material rich in the target nutrient element, and incubating the blend to generate the bioactive nutrient having a predetermined level of the target nutrient element in a combined organic and water blended fraction.

In more detailed features of an exemplary embodiment, the level of the target nutrient element in the combined organic fraction and water fraction is greater than or equal to approximately 75% of the target nutrient element present in the material rich in the target nutrient material. In other, more detailed features of an exemplary embodiment, the level of the target nutrient element in the combined organic fraction and water fraction is between approximately 75% and approximately 85% of the target nutrient element present in the material rich in the target nutrient element. In yet other, more detailed features of an exemplary embodiment, the target nutrient element is an immobile element and is selected from the list including phosphorus, zinc, boron, iron, copper, and manganese.

Another exemplary embodiment is a bio-nutrient fortified fertilizer including a fertilizer particle, a layer of bioactive material rich in a target nutrient element, and a layer of outer coating material. The layer of bioactive material is between the fertilizer particle and the layer of outer coating material, and the outer layer coating material surrounds the fertilizer particle and the layer of bioactive material to form an outer layer.

In more detailed features of an exemplary embodiment, the bioactive layer includes a target source material rich in the target nutrient element and EMM selected to mobilize the target nutrient element.

Other compositions, variations, methods, features and advantages of the subject matter described herein will be or will become apparent to one with skill in the art upon examination of the following detailed description. It is intended that all such additional compositions, variations, methods, features, and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes, and other detailed attributes may be illustrated schematically rather than literally or precisely.

FIG. 3 depicts a chart identifying the proper ratios and method for media 1 for 100 mL F1 breeding of PSM and PGRM.

FIG. 4 depicts a chart identifying the proper ratios and method for production of media for commercial production of PSM and PGRM.

DETAILED DESCRIPTION

The following description of the preferred embodiments of the invention is not intended to limit the invention to these preferred embodiments, but rather to enable any person skilled in the art to make and use this invention. Although any methods, materials, and devices similar or equivalent to those described herein can be used in the practice or testing of embodiments, the preferred methods, materials, and devices are now described.

A preferred embodiment of the present invention relates to improved methods and processes to produce BOP fertilizer through continuous solubilization of rock phosphate by a composting bioprocess and bioaugmentation with phosphorous solubilizing microorganisms.

It must be noted that the preferred embodiment will function either by using PSM (alone), or by using the combination of PSM and PGRM, as described infra. However, the preferred method and process includes the use of both PSM and PGRM, which is further described below. Notwithstanding, the same invention may be practiced by following the steps below, and omitting the steps involving PGRM.

Figure 1:
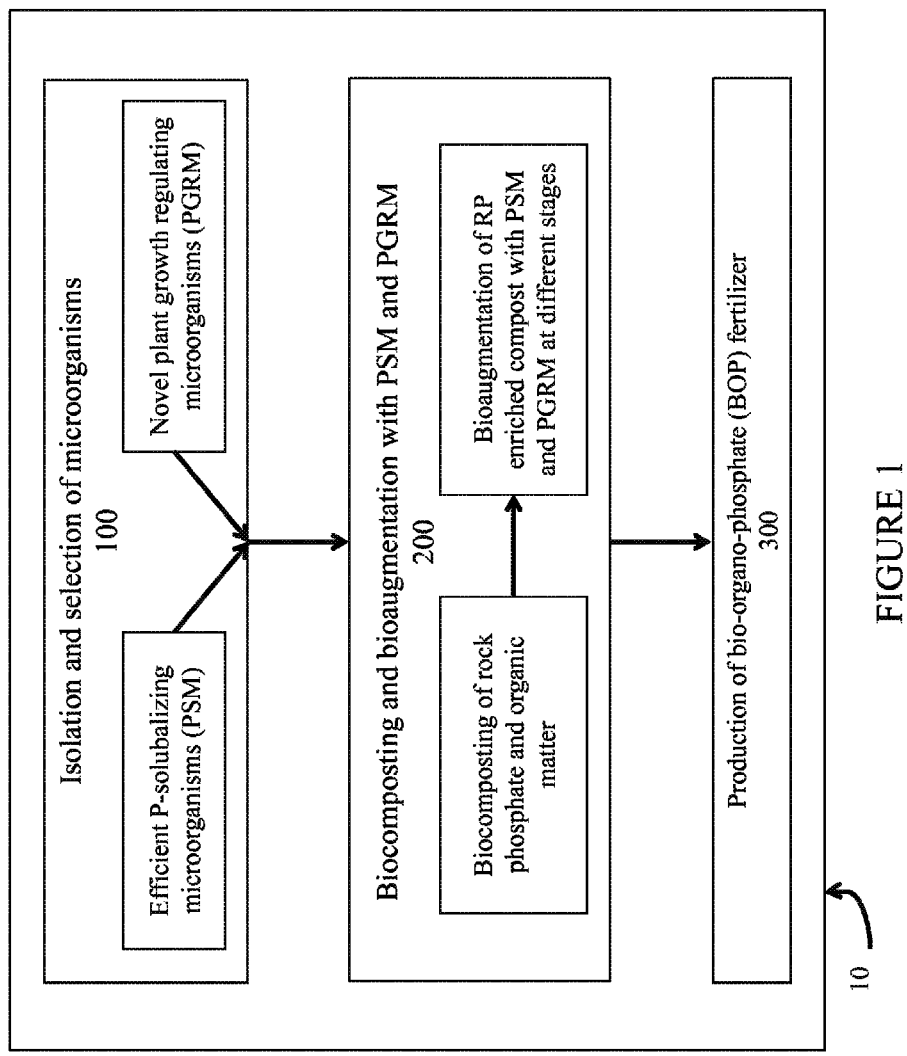
FIG. 1 is a diagram of a method and process to produce BOP fertilizer through continuous solubilization of rock phosphate by composting bioprocess and bioaugmentation with consortia of PSM and PGRM.

As shown in FIG. 1, a preferred method and process 10 to produce BOP fertilizer through rock phosphate solubilization in accordance with a preferred embodiment can generally include isolation and selection of microorganisms 100 (including PSM at a minimum, or preferably the combination of PSM and PGRM), biocomposting and bioaugmentation with PSM and PGRM 200, and finally the production of BOP fertilizer 300.

Figure 2:
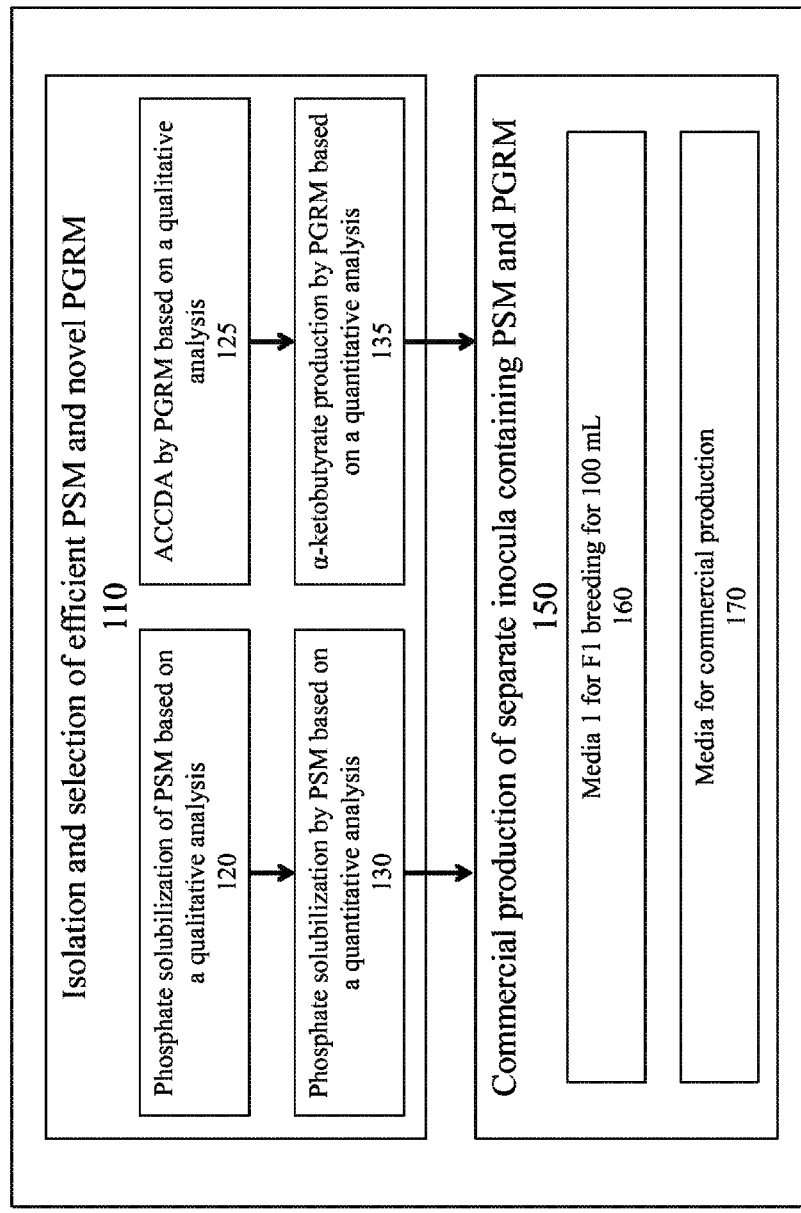
FIG. 2 depicts an overall flowchart illustrating an exemplary embodiment of a process by which isolation and selection of efficient PSM and novel PGRM is accomplished.

As shown in FIG. 2, the isolation and selection of microorganisms 100 may be accomplished through two intermediary steps: (1) isolation and selection of efficient PSM and novel PGRM 110; and (2) commercial production of separate inocula containing PSM and PGRM 150.

As to the first intermediary step (isolation and selection of efficient PSM and novel PGRM 110), rhizosphere soil is collected from crop fields. Crop plants are uprooted at different growth stages and brought to the laboratory in pre-sterilized polythene bags. Non-rhizosphere soil is removed by agitating the roots strongly. Soil strictly adhering to the roots is removed and used for isolation Rhizomicrobes are then isolated by employing a serial dilution plate technique (as exemplified in Zuberer, 1994; see also Semedo, et al., 2001; Shahzad, et al., 2010) using rock phosphate enriched media (PEM) for PSM and ACC enriched media (ACCEM) for PGRM, separately. Colonies exhibiting prolific growth are selected for further streaking on fresh plates of respective medium. Further purification and multiplication of microbial isolates are performed by streaking fresh plates using PEM and ACCEM medium, respectively. The isolated PSM are then examined for P-solubilizing potentials and PGRM for ACC deaminase activity (ACCDA). Forty (40) mL of the sterilized respective broth containing RP and ACC are added to two autoclaved test tubes separately. The media are then inoculated with the PSM and PGRM, respectively, of uniform cell density and incubated between 25° C. to 35° C. An un-inoculated tube is used as a control. The PSM showing maximum phosphate solubilizing and PGRM showing maximum ACCDA are selected for further studies. Culturing conditions for maximized growth of PSM and P-solubilizing activity, and PGRM and ACCDA are thereafter optimized (as described infra) The optimal conditions for PSM and PGRM growth generally are between 25° C. to 38° C. at a pH close to neutral, with an incubation period of fifty to ninety six hours under shaking conditions.

As further shown in FIG. 2, in the preferred method and process, the phosphate solubilizing capability of PSM are observed based on a qualitative analysis 120 and quantitative analysis 130. In addition, ACCDA of the PGRM isolates are observed based on a qualitative analysis 125 as well as α-ketobutyrate production for quantitative analysis 135.

Optimizing the potential of PSM to solubilize rock phosphate based on a qualitative analysis 120 is performed by using the following preferred method and process: An agar medium is prepared where in rock phosphate is the sole phosphorous source. PSM are tested by using halo zone formation. PSM are first cultured in broth for three to five days. Thereafter, a full loop containing culture is placed on each plate while incubating at 25° C. to 38° C. for six to ten days. Toothpicks are used for sampling. The formation of halo zones after fifty to ninety six hours of incubation indicates the PSM's ability to solubilize inorganic phosphorus. The experiment is performed three times to ensure consistent replication.

Optimizing the potential of PSM to solubilize inorganic phosphorous on the basis of quantitative analysis 130 is performed by using the following preferred method and process: A mathematical analysis of the solubilizing activity of PSM is determined by the methods described by Nautiyal (1999). Rock phosphate is used as insoluble inorganic form of phosphate in a broth medium. Quantitative estimations are based on measured performance of phosphate solubilization in broth culture inoculated with selected PSM in triplicate. An autoclaved un-inoculated medium should also be run as a control. Flasks of bacterial strains are incubated for two to four days at 25° C. to 38° C. in an orbital shaking incubator. Cultures are thereafter harvested by centrifugation at 8,000 to 10,000 rpm. A phosphate containing culture supernatant is estimated using the protocol described by Ryan, et al. (2001).

Optimizing the potential of PGRM to generate ACCDA based on a qualitative analysis 125 is performed by using the following preferred method and process: DF minimal medium is prepared as per protocol described by Dworkin and Foster (1958) supplemented with ACC as the sole source of nitrogen. (Penrose and Glick 2003.) Solid DF minimal medium containing ACC is inoculated with a loop of starter culture (grown overnight in LB broth at 24° C. to 30° C. in an orbital shaking incubator). Plates are incubated at 24° C. to 30° C. in darkness. When a colony emerges within two to four days, that event indicates the existence of ACCDA.

Optimizing the potential of PGRM to generate ACCDA based on a quantitative analysis 135 is performed by using the following preferred method and process: Quantitative determination of ACCDA of PGRM is done by measuring production of α-ketobutyrate from ACC. PGRM to be tested for ACCDA are incubated for twenty to thirty hours in DF minimal medium containing ACC in orbital shaking incubator. Then centrifuge the culture at 8,000 to 10,000 rpm and the microbial pellet is obtained. The production of α-ketobutyrate is measured by using the reagent 2,4-dintrophenylehydrazine by following the protocol described by Penrose and Glick (2003).

Referring back to FIG. 2, the second step is the commercial production of separate inocula containing PSM and PGRM 150, which is accomplished by separately growing PSM and PGRM in two different steps using the same growth medium in two different containers. First, $F_1$ breeding 100 mL of medium 1, 160 occurs. Thereafter the same inocula of PSM and PGRM are prepared separately using media in two different containers for commercial production 170. In other words, the basic breeding media is cultivated, then in a second step commercial media is used for large scale biomass production of PSM and PGRM, separately (see tables in FIGS. 3 and 4). Finally the media for commercial production 170, one for PSM and the other for PGRM, should contain several billion bacteria colonies per milliliter in order to keep the respective inoculum viable for culturing, storage, and field application.

As shown in FIG. 3, the $F_1$ breeding for 100 mL of medium 1, 160 is prepared in two different containers for PSM and PGRM, separately, using mannitol, $KH_2PO_4$, yeast extract, and $MgSO_4$ maintaining pH levels of 6.0 to 7.5. The entire mixture is then autoclaved. Thereafter, the selected strains of PSM and PGRM are mixed, in their respective containers, when the temperature drops. The flasks are incubated between 25° C. and 35° C. by continuous shaking on an orbital shaker. The desired population of PSM and PGRM is achieved within fifty to ninety six hours that can be checked periodically by using a UV-visible spectrophotometer.

As shown in FIG. 4, the media for commercial production 170 is prepared in two different containers for PSM and PGRM, separately, using $H_2O$, trypton, calcium pantothinate, yeast extract, vitamin $B_1$, $KH_2PO_4$, and vitamin B12 while maintaining pH levels of 6.0 to 7.5. The pH should be adjusted to the target range by either by adding a few drops of $H_2SO_4$ or NaOH. The entire mixture is then autoclaved. Thereafter, the selected strains of PSM and PGRM are mixed in their respective containers when temperature drops. The flasks are incubated between 25° C. and 35° C. under shaking conditions by using continuous aeration. The desired population is achieved within fifty to ninety six hours that can be checked from time to time by using UV-visible spectrophotometer.

Referring back to FIG. 1, the second major method and process is biocomposting and bioaugmentation with PSM and PGRM 200. Organic waste material is collected and sorted out to remove unwanted substances. The stored organic material is air dried to bring the moisture level below 30%. Dried organic matter along with rock phosphate is transferred into a composting unit. Readily available C-source (at 2% to 4%) is added during the composting to accelerate the bioprocess in a composter with an adjustable temperature, pH, and aeration. The process is carried out by shaking at 50 rev $min^{-1}$. Bioaugmentation with PSM and PGRM, separately, is then performed at later stages when the temperature falls to a level required to support mesophilic growth.

Figure 5:
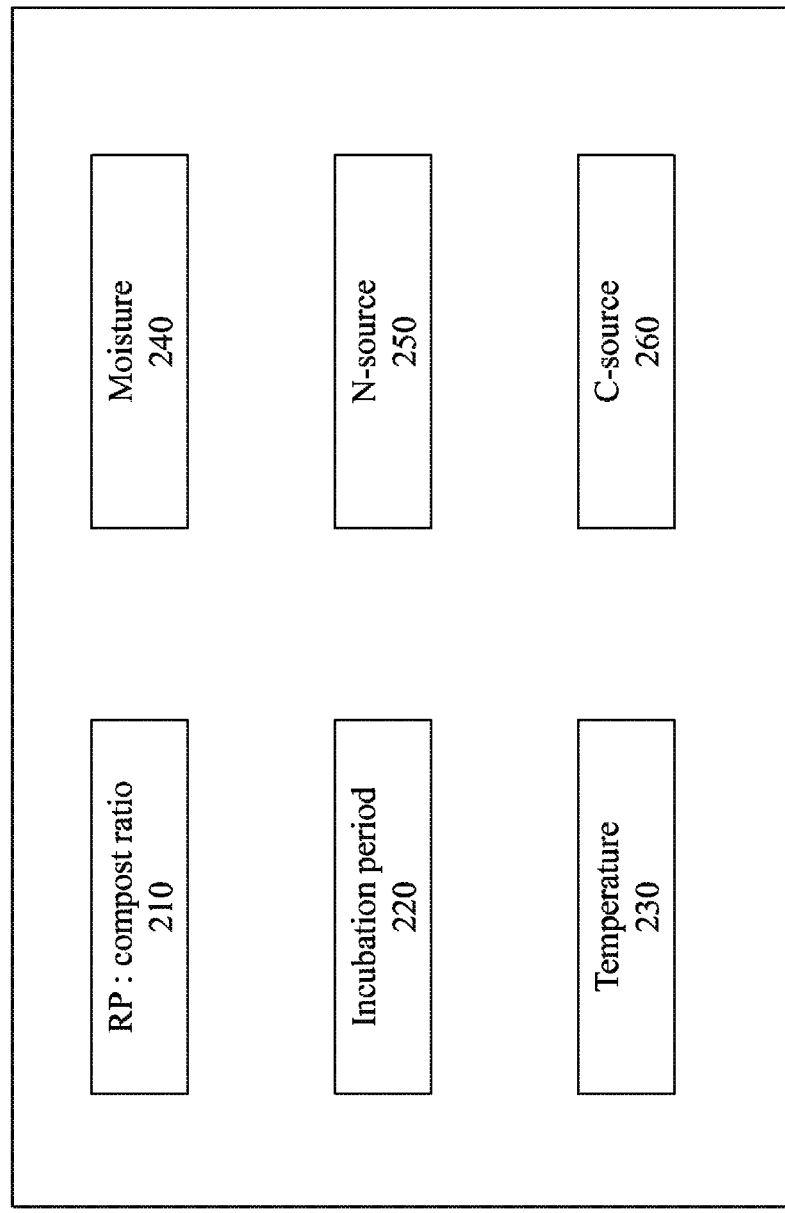
FIG. 5 depicts a chart of the factors that are preferably controlled during the composting process.

Referring to FIG. 5, there are six factors that must be optimized during the composting bioprocess 200 in light of variables such as soil types, organic matter, and climate considerations. Namely: (1) rock-phosphate to compost ratio (RP: compost ratio) 210; (2) incubation period 220; (3) temperature 230; (4) moisture 240; (5)N-source 250; and (6)C-source 260. Each is discussed, in turn:

Rock-phosphate to compost ratio 210: In order to optimize the RP: compost ratio, different ratios should be used and analyzed during composting to test for maximum release of phosphorus from rock phosphate enriched compost (RP-EC) upon spiking in soil. It has been generally observed that ratios between 45:100 (RP:EC) and 60:100 (RP:EC) release the most phosphorous when spiked in soil.

Incubation period 220: Incubation time for optimum solubility of RP in RP-EC is determined by using different samples collected at different incubation times during the composting process. The release of P should be measured by spiking in soil with RP-EC. It has been generally observed that maximum phosphorous is released between nine to fourteen days of incubation.

Temperature 230: Simultaneously while controlling the incubation period 220, the suitable RP-compost mixture should also be evaluated at different temperature levels. Data should be collected weekly from RP-EC spiked soil to test for efficient release of phosphorous. It has been generally observed that maximum phosphorous is released when temperatures are controlled between 30° C. and 40° C.

Moisture 240: The suitable RP-compost mixture should likewise be evaluated at different moisture levels. Data should be collected weekly from RP-EC spiked soil to test for efficient release of phosphorous. It has generally been observed that maximum phosphorous is released when moisture is controlled between 10% and 15%.

N-source 250: Trypton is a preferred N-source. For determining the best concentration of N-source to accelerate multiplication of microflora for accelerated solubilization of RP-P, different N levels should be tested. Data should be collected weekly from RP-EC spiked soil for efficient release of phosphorous. It has generally been observed that maximum phosphorous is released when N-source concentrations are controlled between 1% and 2% when spiked in soil.

C-source 260: High grade saccharose is a preferred carbon source. C-source concentration for optimum solubility of RP in RP-EC during composting bioprocess should be determined by adding different levels of C-source upon onset of composting. The release of phosphorous should be measured in soil spiked with RP-EC. It is commonly observed that maximum phosphorous is released when C-source concentration is controlled between 2% to 4%.

In the alternative, for formulation with manures, RP at desired concentration is blended and mixed with organic matter in the composting unit while controlling the RP:compost ratio, incubation period, temperature, moisture, N-source, and C-source. During this process, organic acids are released from decomposing organic matter that help solubilization of RP. The decomposition of organic material is determined by measuring C:P ratio. The resultant product would be rich in phosphorous as indicated by C:P ratio and mineralization potential in spiked soil.

Referring back to FIG. 1, the final major method and process is the production of bio-organo-phosphate (BOP) fertilizer 300. During the composting process of RP-EC, inocula of PSM and PGRM are added at different stages at the population level of several billion upon the onset of mesophilic phase (<25° C. to 35° C.) for better survival and multiplication. A finished product in the form of BOP fertilizer occurs in two to four days of incubation.

A series of laboratory incubation trials should be conducted before and after spiking soil with BOP fertilizer to determine plant-available phosphorous content in native soil, ACCDA, and phosphorous content ($P_2O_5$) of formulated BOP fertilizer. Temperature should be controlled between 18° C. and 25° C. when conducting trials. As a benchmark, the effectiveness of the BOP fertilizer should be compared with commercial phosphatic fertilizer by using a variety of crops and vegetables, and using a multiplicity of field trials.

Another preferred embodiment relates to improved methods and processes to produce bioactive nutrient fortified fertilizer (BNFF) through bioaugmentation of organic matter powder (OMP) with EMM and blending this with sources rich in target nutrient elements. The process provides enhanced bioavailability of the target nutrient elements, particularly immobile or less mobile elements, such as P, zinc (Zn), boron (B), iron (Fe), copper (Cu), manganese (Mn), and other elements necessary for improved plant growth. It should be understood that the term "immobile", as used herein, refers to elements that are both immobile and less mobile. The process uses EMM-bioaugmented organic complexes to bioactivate and mobilize the immobile nutrient elements found in sources rich in the target nutrient, thereby increasing the availability of the immobile nutrient elements to plants.

Mobile nutrient elements are soluble in water and are distributed in soil by the flow of water through soil. Immobile/less mobile nutrient elements are insoluble or partially soluble in water and are not freely distributed by the flow of water through soil. Instead, immobile/less mobile nutrient elements move through soil by diffusion and are taken up by root contact. Some nutrient elements, when complexed with specific organic compounds, are also referred as less mobile. Nutrient elements are referred to as immobile if they do not travel with soil water at all, and are referred to as less mobile nutrient elements if they are converted into a state in which some fraction moves slowly with soil water.

Figure 6:
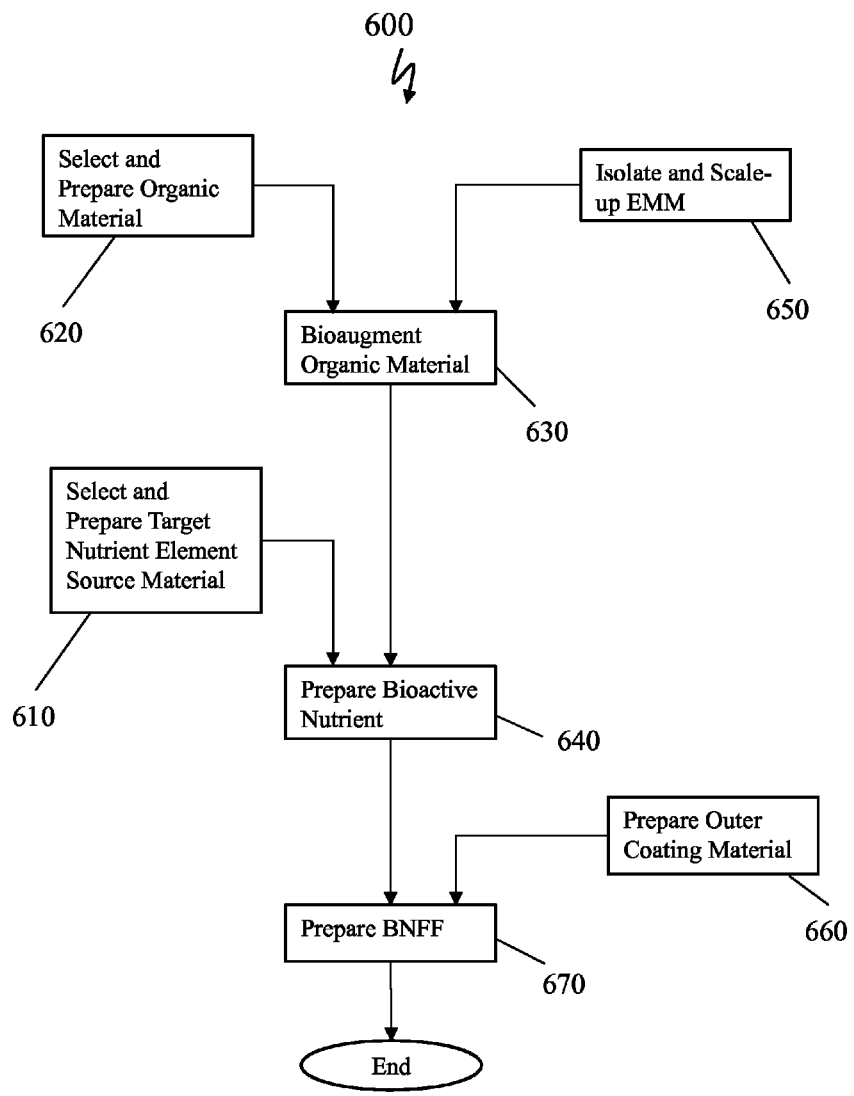
FIG. 6 is a flowchart of an overall process to produce bioactive nutrient fortified fertilizer.

The overall process is shown generally at 600 in FIG. 6. Four separate processes 610, 620, 650, and 660 merge at various points in the overall process to produce BNFF. The four separate processes are independent of one another and can be scaled such that the entire yield of the separate processes, or a portion thereof, is used in subsequent steps in the overall process. If only a portion of the yield is used, the remaining portion can be stored and used in a later iteration of the overall process.

Figure 7:
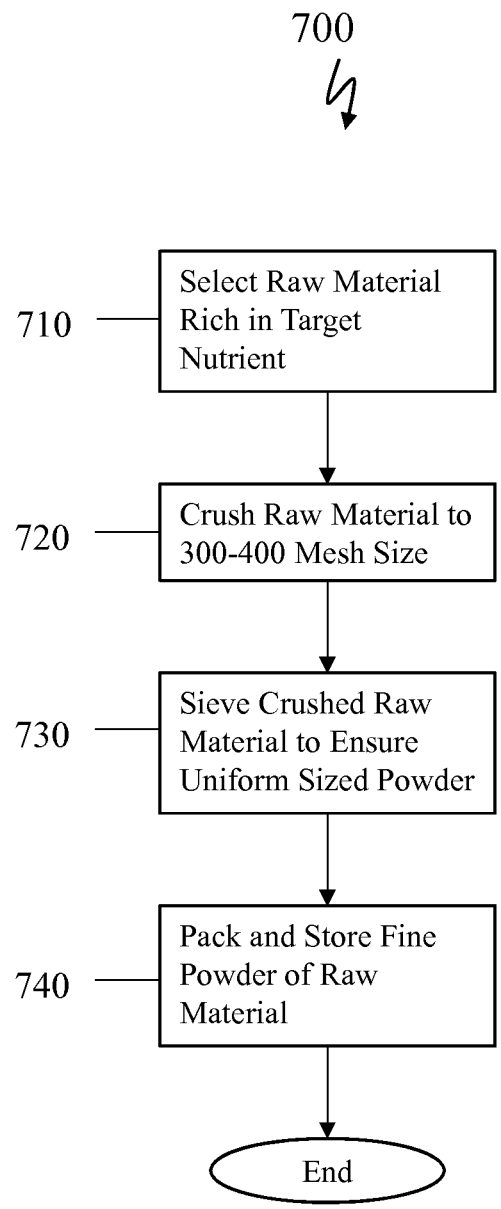
FIG. 7 is a flowchart of a process to produce source material rich in the target nutrient element for use in the production of bioactive nutrient fortified fertilizer.

One of the independent processes 610 is selection and preparation of the target nutrient element source material. A detailed flowchart of process 610 is shown generally at 700 in FIG. 7. The first step 710 is selection of the raw material. The selection of a raw material depends on the target nutrient element that is chosen. Raw materials can be selected from a variety of inorganic sources, such as ores or waste products containing either ash, oxides, or sulfides of zinc, manganese, iron, or copper. Suitable raw materials should be relatively rich in the target nutrient element. For example, suitable sources of zinc include the zinc ore sphalerite, which contains 60% Zn, others include smithsonite, hemimorphite, and wurtzite, etc. Suitable sources of manganese, iron, and copper include, for example, manganese ores pyrolusite, braunite, psilomelane, rhodochrosite, iron ores hematite, magnetite, chalcopyrite, and copper ores chalcocite, azurite, malachite, and cuprite, etc.

Once the source of the target nutrient element is identified and obtained, the source material is crushed in step 720 using methods known to those of ordinary skill in the art. The source material may be crushed a number of times through different types of crushers to obtain the desired mesh size.

The finely crushed source material is sieved or otherwise sorted into the desired mesh size in step 730. In some embodiments, the crushed source material is finer than approximately 300 mesh size, or alternatively, less than approximately 0.002 inch in size. In other embodiments, the crushed source material is between approximately 300 mesh size and approximately 400 mesh size, or alternatively, between approximately 0.002 inch and approximately 0.0015 inch. The size of the crushed source material determines how much of the target nutrient element is available to the EMM used in the subsequent steps described below. It is desired that approximately 30% to 50% of the target nutrient element is converted to a mobile form. The prepared finely ground source material is packed and stored in step 740 for use in a later step.

Figure 8:
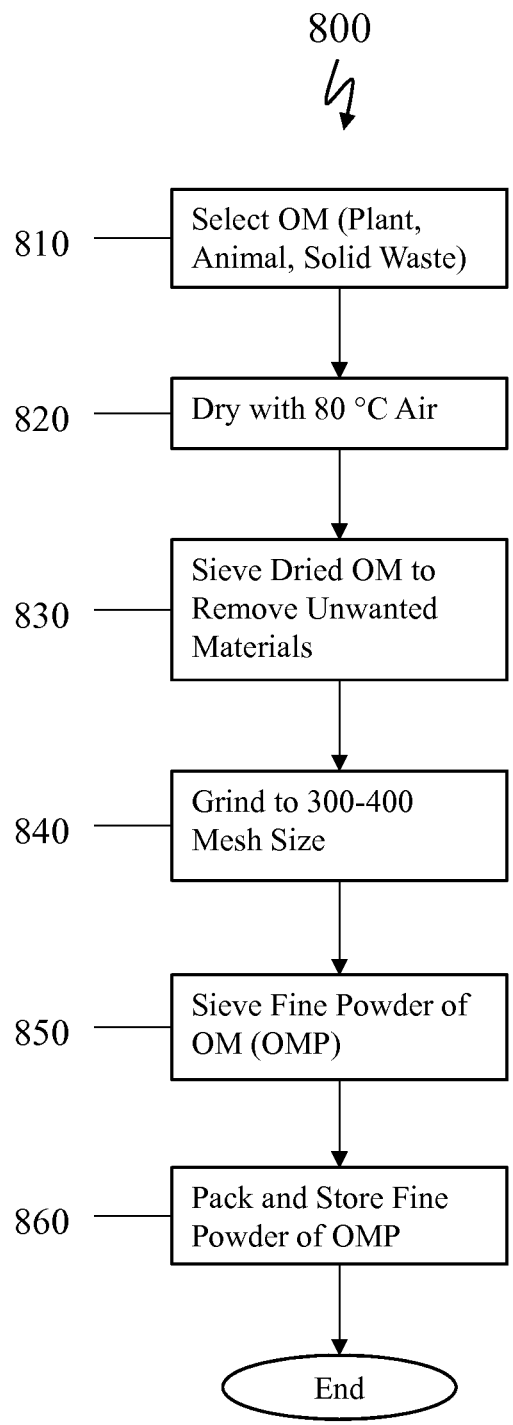
FIG. 8 is a flowchart of a process to produce organic material for use in the production of bioactive nutrient fortified fertilizer.

Returning to FIG. 6, another of the independent processes is the step of selection and preparation of organic material 620 for use in later bioaugmentation 630 and bioactivation 640 steps. A detailed flowchart of process 620 is shown generally at 800 in FIG. 8. Selection of a suitable source of organic material (OM) is the first step 810. Suitable organic matter includes, for example, press mud of the sugar industry, byproducts of the citrus juice industry, vegetable waste, fruit waste, poultry manure, farm yard manure, and other compostable plant and animal matter, etc. The choice of OM also depends on possible interactions of the OM with the target nutrient element.

In step 820, the selected OM is exposed to 80° C. air for a sufficient amount of time to remove contaminating microbes and to dry the OM. The dried OM is sieved to remove unwanted matter in step 830 and then ground to between approximately 300 and approximately 400 mesh size in step 840. The clean, finely ground OMP is sieved in step 850 and stored in heat-sealed polyethylene (PE) bags under ambient conditions in step 860 to avoid contamination or deterioration. The OMP will be used in a later step.

Figure 9:
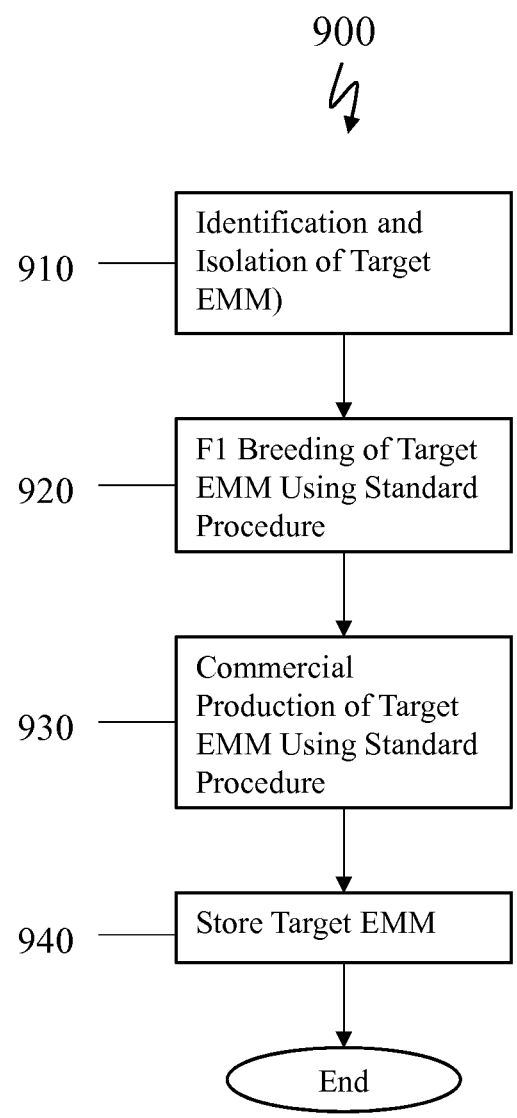
FIG. 9 is a flowchart of a process to isolate and produce large quantities of EMM for use in the production of bioactive nutrient fortified fertilizer.

Referring back to FIG. 6, another of the independent processes 650 is isolation and preparation of large quantities of EMM. FIG. 9 is a detailed flowchart of process 650 shown generally at 900. Identification and isolation of candidate EMM occurs in step 910 and is similar to the procedures previously described. The selected medium for a target nutrient element is prepared and enriched with the target nutrient element, then added to Petri dishes. Rhizosphere soil is diluted in sterilized water at a ratio between $10^{-3}$ and $10^{-9}$ to 1 (rhizosphere soil:water, v/v) under aseptic conditions. The diluted rhizosphere soil is added to the prepared Petri dishes at a rate of 1 ml/plate and incubated at 30±3° C. for 5-7 days. For each target nutrient element, microbial strains that show prolific growth in the presence of the target nutrient element are selected, purified, characterized, and identified using standard microbiological procedures in screening. In this manner, EMM for a specific immobile target nutrient element can be identified and isolated as a parent culture.

It should be noted that EMM may or may not be different than PSM but are different from PGRMs with respect to their ability to mobilize the target nutrient element through mechanisms, which could be different from that PSM or EMM. PGRMs exclusively affect the plant growth through non-nutrient mechanism such as ACCDEM activity. Some EMM solubilize the target nutrient element in the soil solution by changing its oxidation state or chemical composition, and are referred to as solubilizing microbes. Other EMM make the target nutrient element available to the plant without solubilizing in soil water, and are known as mobilizing microbes. For instance, the chelated form of various nutrients are not water soluble but plant available. Regardless of the type of EMM, they can be isolated and purified by steps similar to those for isolating and purifying PSMs or PGRMs.

Step 910 can be repeated for another target nutrient element, and the isolated EMMs from repeated steps 910 may be combined or kept separate. Alternatively, a medium containing more than one target nutrient element can be prepared, and EMMs that are able to mobilize multiple target nutrients may be isolated. In some cases, multiple strains of EMMs can be isolated from a medium containing more than one target nutrient element.

Once an EMM for a specific target nutrient element is identified, an $F_1$ generation of the EMM is cultured in step 920 as described previously. The parent culture is maintained under specific conditions, such as freezing, for future use if the $F_1$ culture becomes contaminated. The $F_1$ culture is kept viable and samples are used to produce commercial quantities of the EMM using standard microbiological procedures in step 930. Commercial quantities of EMM are stored under aseptic conditions, incubated at an optimal of temperature (27±2° C.), and spiked with special C-sources, such as saccharose, in step 940 to maintain viability until used in the subsequent bioaugmentation step.

Figure 10:
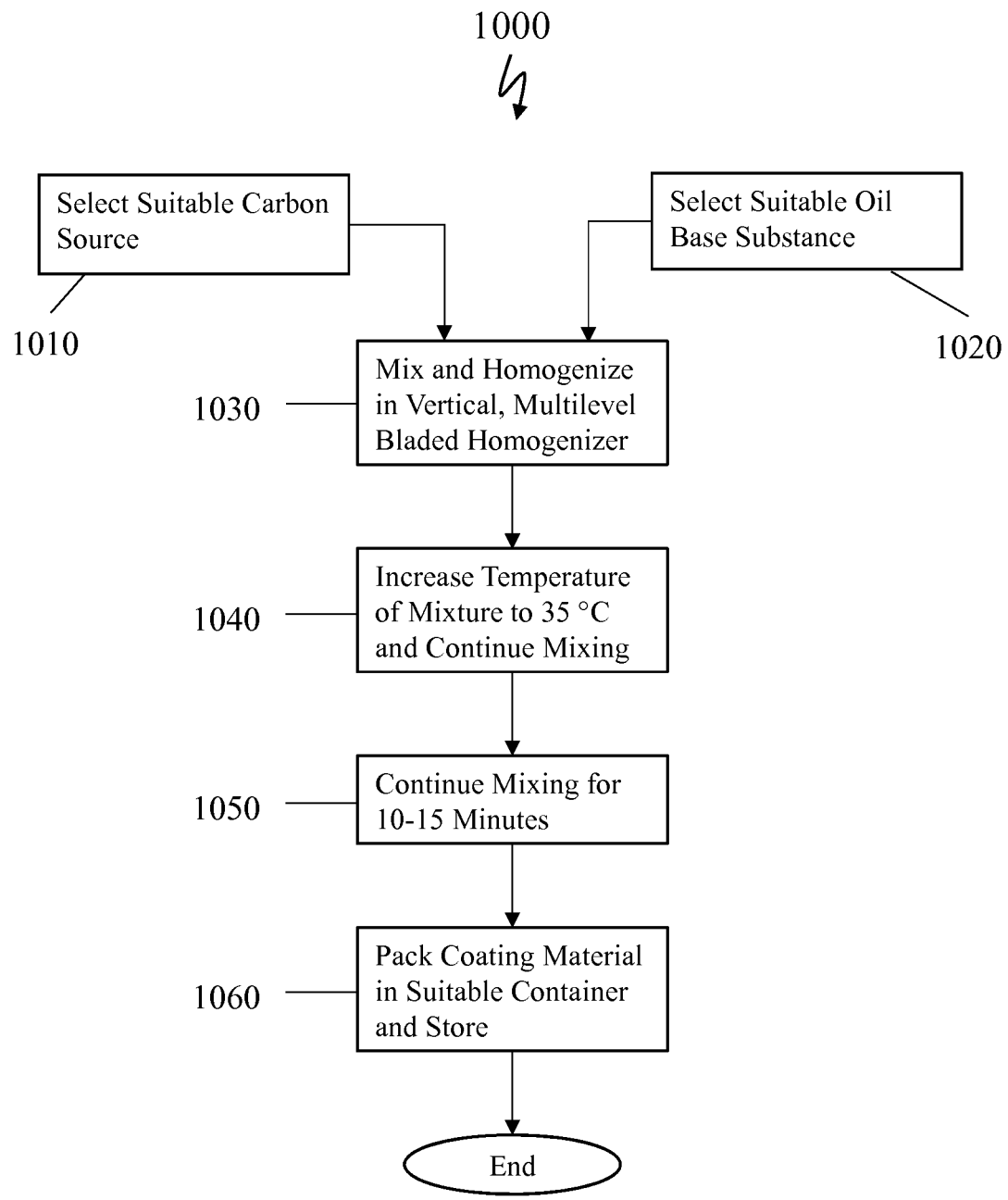
FIG. 10 is a flowchart of a process to produce a coating material for use in the production of bioactivated nutrient fortified fertilizer.

Referring once again to FIG. 6, in another independent step of the overall process 660, a protective outer coating material is prepared. A detailed flowchart of process 660 is shown generally at 1000 in FIG. 10. The outer coating material enhances shelf life and maintains the quality of the BNFF during storage and transportation. Any known outer coating material that achieves these goals is suitable.

In one embodiment, a suitable source of carbon and/or nitrogen, for example, mannitol, saccharose, trypton, peptone, yeast extract, and/or fruit and vegetable waste, or mixtures thereof, is selected in step 1010 and a suitable oil base material, for example vegetable oil, is selected in step 1020. In step 1030, a specified quantity of the carbon and/or nitrogen source, for example, 20-40% of the bioactive nutrient material (see below) that will be coated, and the oil base material, approximately 2-5% of the composition, are placed in a water-cooled vertical multilevel blade homogenizer. Cooling water flows through the outer shell of the homogenizer to keep the temperature between 30° C. and 35° C. while the contents are mixed. The materials are heated to 35° C. in step 1040 and blended at high speed for approximately 10 to 15 minutes in step 1050. After blending, the mixture is homogenous and stable. A surfactant, such as sticky sugar industry waste, can be used to keep the homogenous mixture from separating during storage. In step 1060, the prepared outer coating material can be stored in a suitable container and sealed to prevent moisture egress, contamination, and quality deterioration during storage.

Figure 11:
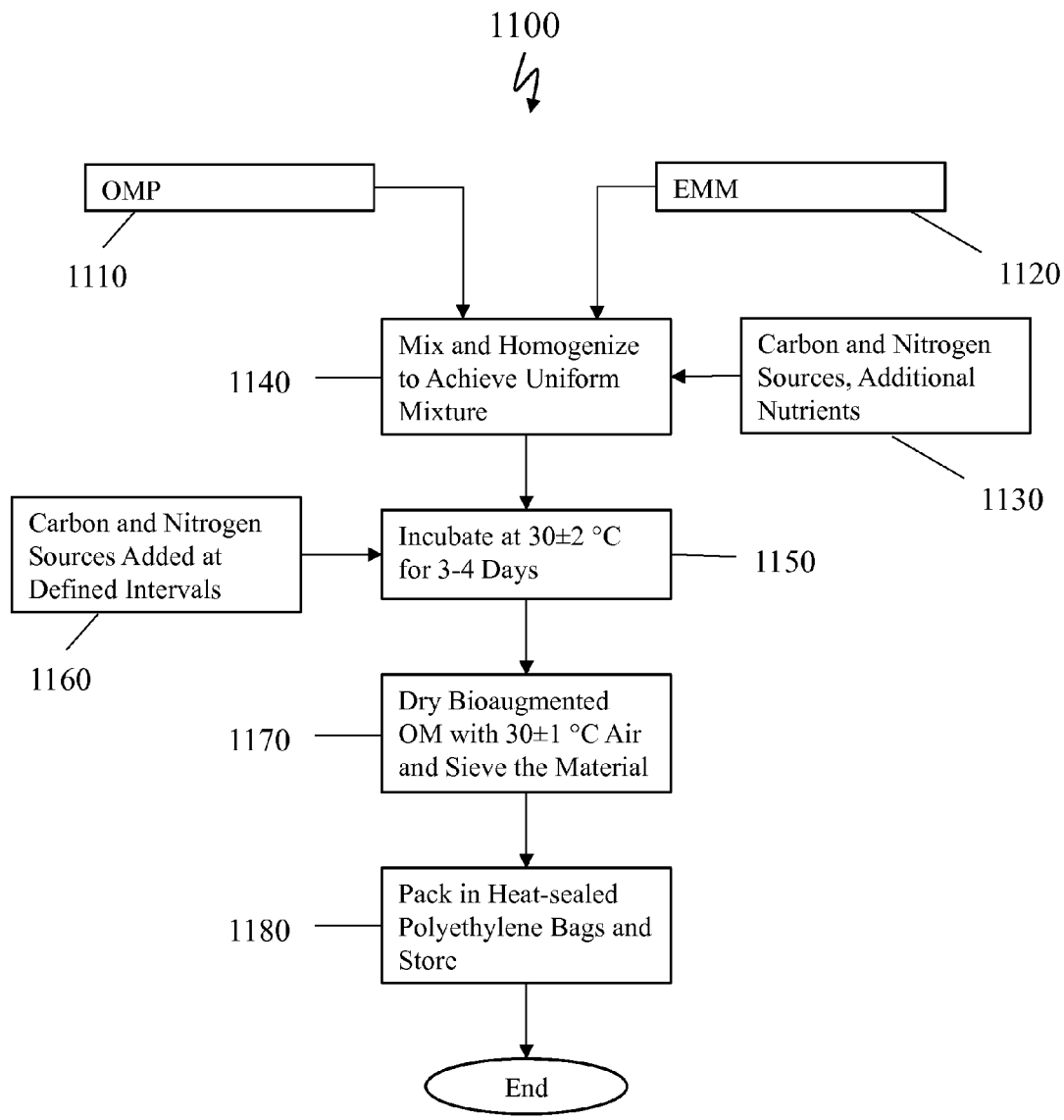
FIG. 11 is a flowchart of a process to bioaugment the organic material from the process shown in FIG. 8 with the EMM from the process shown in FIG. 9.

Step 630 in the overall process shown in FIG. 6 is bioaugmentation of the OMP with EMM. In this step, shown generally at 1100 in the detailed flowchart of FIG. 11, OMP is inoculated with EMM and the inoculated OMP is incubated under conditions in which the EMM proliferates.

In one embodiment, approximately 20-40 kg of OMP 1110 is inoculated with 1 L of EMM 1120. The blend of OMP and EMM is biostimulated by the addition of suitable sources of carbon and/or nitrogen 1130. For example, approximately 1 kg of mannitol, saccharose, trypton, peptone, yeast extract, and/or fruit and vegetable waste, or mixtures thereof, or other similar sources of carbon and/or nitrogen can be used. Additionally, approximately 0.5 kg of a nutrient source, for example, Hoagland solution, is added. The mixture of OMP, EMM, carbon and/or nitrogen sources, and nutrients is mixed to achieve a uniform mixture in step 1140. The mixture is incubated at 30±2° C. for 3-4 days at step 1150, during which time additional carbon and/or nitrogen sources and other nutrients are added at predetermined intervals 1160, for example 1-2 kg of carbon and/or nitrogen sources and 5-100 kg of other nutrients, until the maximum population of EMM is attained by measuring the optical density (OD) of the culture.

After the target level of EMM is attained, the bioaugmented OMP is dried with filtered air at 30±1° C. in step 1170. Once dried, the bioaugmented OMP is passed through a 300 to 400 mesh sieve to ensure purity and uniformity. The bioaugmented OMP is packed into polyethylene bags and the bags are heat-sealed to prevent moisture ingress, contamination, and deterioration in step 1180. The bags are stored at a temperature of between 25° C. and 37° C. and in a manner to avoid damage to the polyethylene bag.

Figure 12:
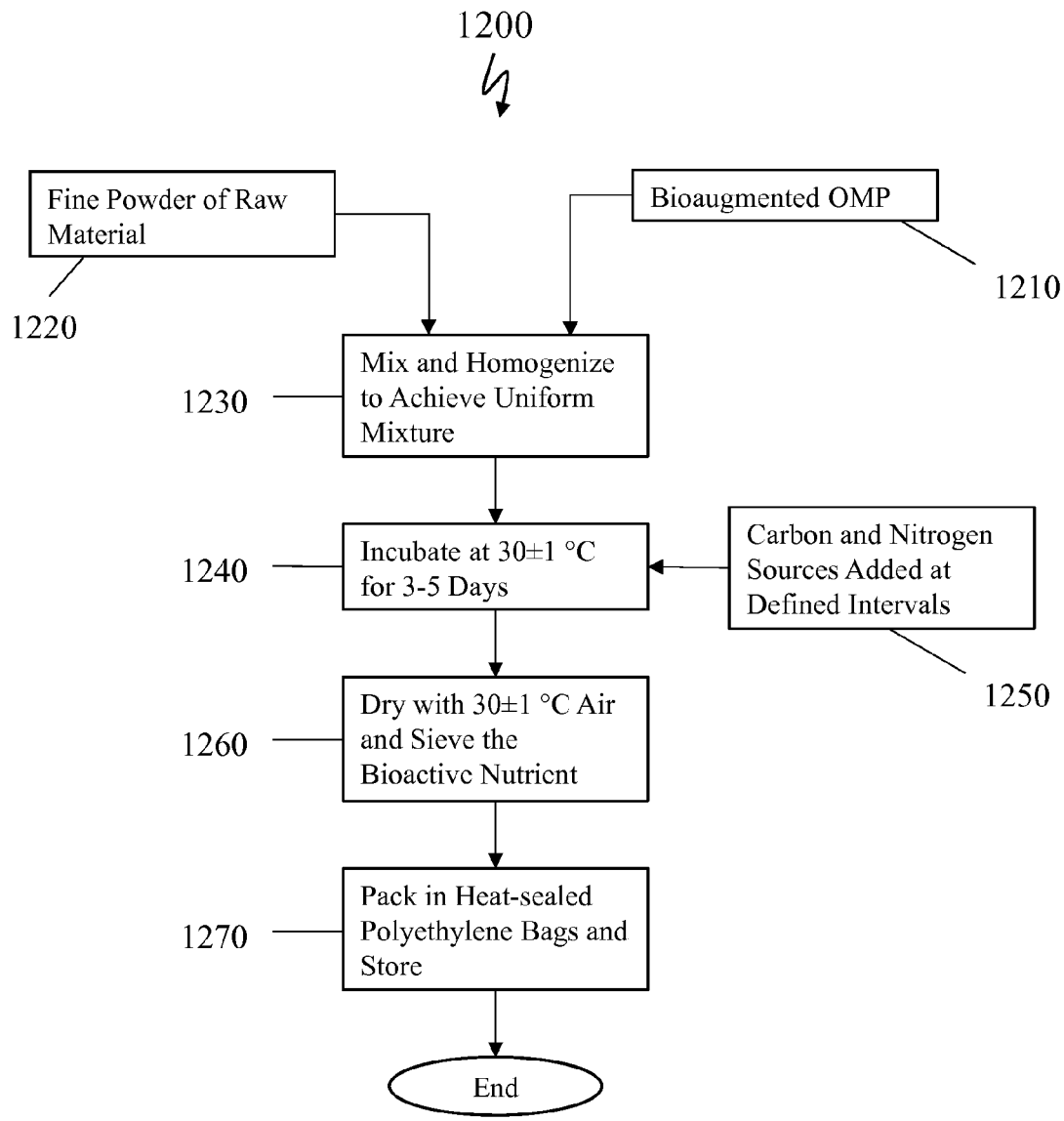
FIG. 12 is a flowchart of a process to produce bioactivated nutrient from the source material from the process shown in FIG. 7 and the bioaugmented organic material from the process shown in FIG. 11.

The next step 640 shown in FIG. 6 is preparing the bioactivate nutrient. This step is shown generally at 1200 in the detailed flowchart shown in FIG. 12. Bioactivation takes place by combining bioaugmented OMP containing EMM 1210 with the finely ground source material 1220 rich in the target nutrient element associated with the specific EMM.

The mixture is approximately 20% to approximately 40% bioaugmented OMP and approximately 40% to approximately 80% source material.

In one embodiment, approximately 20-40 kg of bioaugmented OMP and approximately 60-80 kg of the source material are blended, in step 1230, in a mechanical mixer until the blend is uniform. The mixture is incubated at 30±1° C. for 3-5 days in step 1240. During the incubation period, carbon (1%) and nitrogen (0.01%) sources and other required nutrients (for example, 1 ml of Hoagland solution), are added to the blend in step 1250 with mixing to uniformly disperse the additives.

Samples are periodically taken from the incubating mixture and analyzed for target nutrient element and EMM levels. The sample is tested for organic complexes and water soluble compounds of the target nutrient element. The level of the target nutrient element in the water soluble and organic fractions should total between approximately 75% to approximately 85% of the amount present in the source raw material at the start of the bioactivation process.

When the incubation period is complete, the bioactivated blend is standardized to approximately $10^6$ to $10^9$ EMMs per gram of bioactivated blend. The bioactivated blend is dried in step 1260 with filtered air at a temperature of 30±1° C. then passed through a 300 to 400 mesh sieve to ensure purity and uniformity. The finely powdered bioactive nutrient is packaged in polyethylene bags and heat-sealed to avoid moisture ingress, contamination, and deterioration in step 1270. The packaged bioactive nutrient is stored at a temperature less than 37° C. to ensure viability of the EMM.

It should be understood that, in alternative embodiments, the bioaugmentation and bioactivation steps can be combined. The appropriate amounts of OM, EMM, and target element source material can be blended and incubated with periodic additions of carbon and nitrogen sources and other nutrients to produce the bioactivated blend. Analysis of the bioactivated blend is performed as described above to determine the end of the incubation period. Packaging and storage is as described above.

Figure 13:
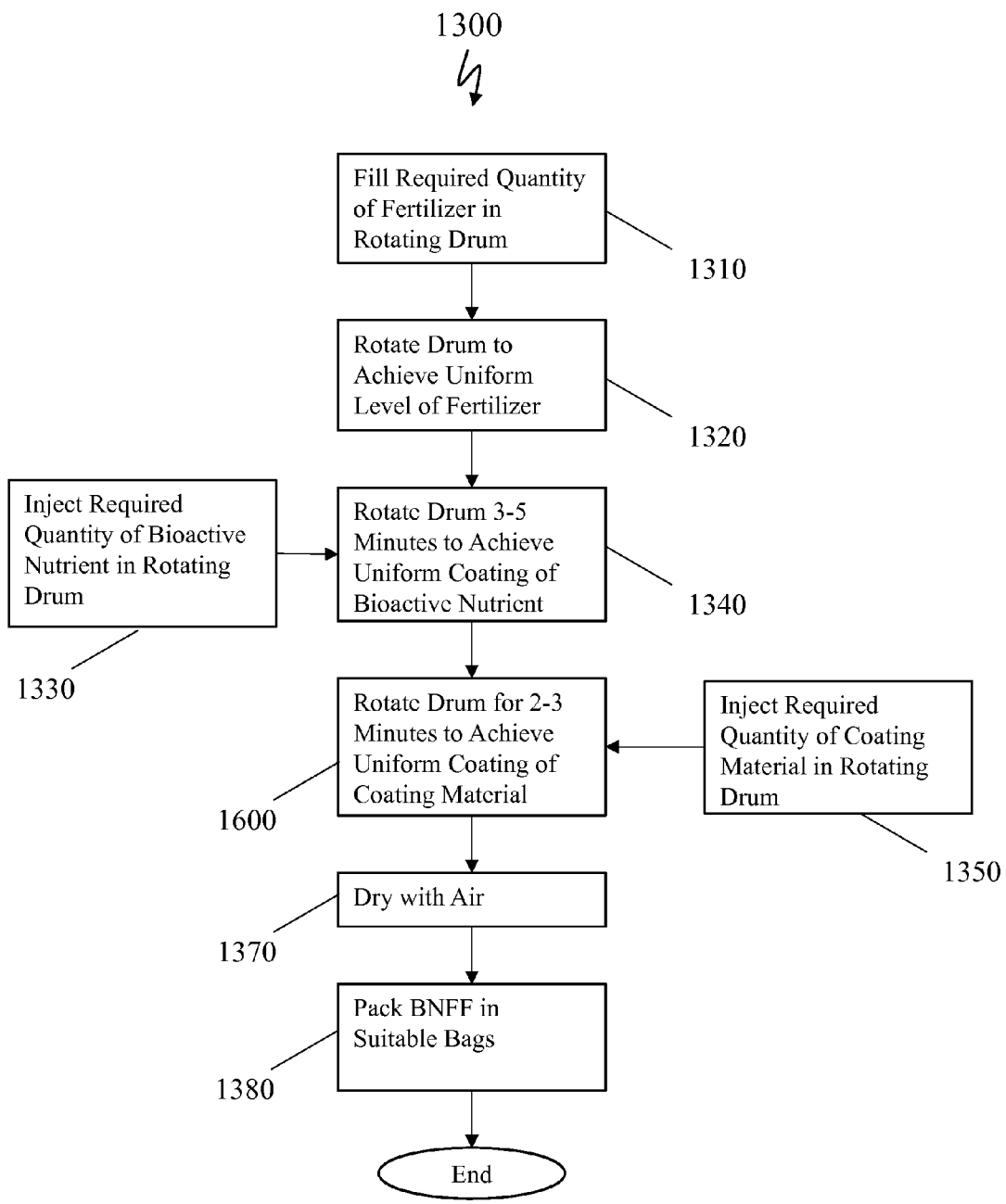
FIG. 13 is a flowchart of a process to product bioactive nutrient fortified fertilizer from a base fertilizer, the bioactivated nutrient from the process shown in FIG. 12, and a coating material from the process shown in FIG. 10.

Step 670 of FIG. 6 is the preparation of BNFF. Step 670 is shown generally at 1300 in detailed flowchart of FIG. 13. To prepare the BNFF, a desired quantity of a selected fertilizer is added to a rotating drum in step 1310. The fertilizer can include macro- and micronutrients and other additives to enhance plant growth, and particles of the fertilizer can be in granular or prill form. The rotational rate of the drum is controlled to avoid degradation of the particles of fertilizer and to achieve a uniform level of fertilizer in the drum in step 1320. After the fertilizer is added, a predetermined amount of the bioactive nutrient that includes the desired bioactive nutrient element is injected into the drum in step 1330, and the drum is rotated for approximately 3-5 minutes, or until the 300 to 400 mesh size bioactive nutrient is uniformly coated onto the particles of fertilizer in step 1340. A small amount of a solution of an organic carbon source is used as a cementing agent to bind the bioactive nutrient to the fertilizer particles. Samples are periodically removed to check for uniformity of coating. When the bioactive nutrient material is uniformly coated, a predetermined amount (for example, 3.0 kg per 100 kg) of the outer coating material is injected into the rotating drum in step 1350. The drum is rotated for approximately 2-3 minutes to uniformly coat the outer coating material onto the bioactive material coated fertilizer in step 1360. Samples are periodically removed to check for uniformity of coating. Air at 30° C. is then passed through the drum for about 1-2 hours until the BNFF is dry at step 1370. The dry BNFF is packaged, for example, into woven polypropylene bags lined with a polyethylene liner in step 1380.

Figure 14:
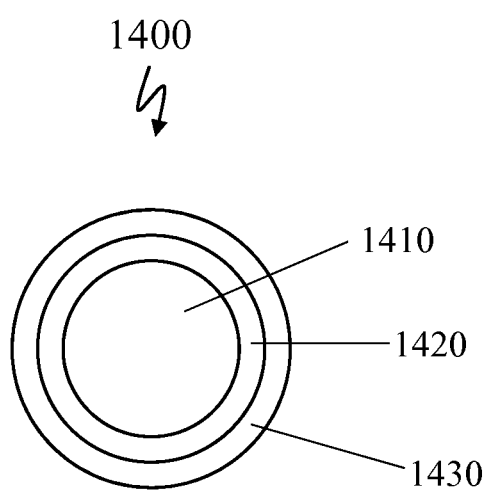
FIG. 14 is a cross-sectional view of a bioactive nutrient fortified fertilizer from the process shown in FIG. 13.

In FIG. 14, a cross-sectional view of a single granule or prill of the finished BNFF is shown generally at 1400. The central volume of the granule is the selected fertilizer 1410. The fertilizer can be any commercially available fertilizer, or can be a custom-made fertilizer specific to a type of crop plant. The fertilizer can include conventional NPK fertilizers and may also include other macro- and micro-nutrients. The particles of the selected fertilizer can range in size, but are generally between approximately 1-5 mm in diameter, although particles of some fertilizers can be significantly larger or smaller.

A coated layer of bioactive nutrient 1420 covers the surface of the selected fertilizer granule or prill. The bioactive nutrient coating generally coats the fertilizer particle uniformly, however, imperfections in the uniformity will not impact the efficacy of the final BNFF product. The thickness of the bioactive nutrient layer is approximately 0.5 mm to approximately 1.0 mm. It should be noted that in some embodiments, the bioactive nutrient may be present in insufficient amounts, or insufficiently dispersed, to cover the entire surface of the selected fertilizer without detracting from the efficacy of the final BNFF product.

The outermost layer is the outer coating material 1430 which completely envelopes the bioactive material layer and the central fertilizer, thus sealing and protecting the BNFF particle. The thickness of the outer coating material can be thin, for example, less than 0.5 mm in thickness, or it can be relatively thick, for example, 3 mm or more in thickness. Additionally, the outer coating may soak into or between particles of the bioactive material, such that the interface between the two layers may be a gradient.

The BNFF 1400 produced according to the process 600 described above can be broadcast without significant change to a farmer's fertilizer use habits. The bioactive nutrient has higher bioavailability and is less prone to fixation or leaching losses ensuring availability to crop plants for longer periods of time. An ample supply of the bioactive nutrient eliminates deficiency of the target nutrient element and improve efficiency of other applied or available nutrients leading to better crop yields and increased agricultural productivity.

EXAMPLE 1

Urea Z

This example describes production of a BNFF based on urea as the fertilizer or carrier and bioactive zinc as the coated nutrient element. This example includes the following steps:

Step 1: Select a raw material rich in zinc, such as a zinc-containing ore. The zinc-rich raw material is ground to a very fine powder and analyzed for Zn content.

Step 2: Prepare bioaugmented OMP and coating material as described above. The organic material is bioaugmented with a specific strain of EMM optimized for zinc bioavailability and biostimulated for optimum growth.

Step 3: Prepare bioactivated zinc nutrient as described above by blending the fine mesh zinc-rich material from step 1 with bioaugmented OMP from step 2 in the ratio of 60:40.

Step 4: Coat urea fertilizer with bioactivated zinc nutrient from step 3 to produce Urea Z. Known quantities of urea and bioactivated zinc nutrient are blended in a mixer in a ratio of 100:1.5 with a cementing agent (approximately 2%).

EXAMPLE 2

Bio Organo Zinc (BOZ)

This example describes production of a BNFF based on granules of compost as the fertilizer or carrier and bioactive zinc as the coated nutrient element. The process includes:

Step 1: Select a raw material rich in zinc, such as a zinc-containing ore. The zinc-rich raw material is ground to achieve a fine powder and analyzed for Zn content.

Step 2: Prepare bioaugmented OMP and coating material as described above. The organic material is bioaugmented with a specific strain of EMM optimized for zinc bioavailability and biostimulated for optimum growth.

Step 3: Prepare granules of compost from a suitable source (animal, plant and/or solid waste) as per standard methods of composting and granulation by using standard procedures of composting through maintaining temperature, moisture, air, and inocula.

Step 4: Prepare bioactivated zinc nutrient as described above by blending the fine mesh zinc-rich material from step 1 with bioaugmented OMP from step 2 in the ratio of 60:40.

Step 5: Coat granules of compost from step 3 with bioactivated zinc from step 4 to produce BOZ. Coating is done in a mixer by combining bioactivated zinc and compost granules in the ratio of 11:5. Mixing for approximately 30 minutes yields a fine layer of bioactivated zinc on the compost granules.

The preceding described embodiments of the invention are provided as illustrations and descriptions. They are not intended to limit the invention to precise form described. In particular, it is contemplated that functional implementation of invention described herein may be implemented equivalently in functional components, ingredients, processes or building blocks. Other variations and embodiments are possible in light of above teachings, and it is thus intended that the scope of invention not be limited by this Detailed Description, but rather by Claims following.

REFERENCES

Other Publications

Ahmad, R., S. M. Shahzad, A. Khalid, M. Arshad and M. H. Mahmood. 2007a. Growth and yield response of wheat (Triticumaestivum L.) and Maize (Zea mays L.) to nitrogen and L. Tryptophan enriched compost. Pak. J. Bot. 39: 541-549.

Ahmad R., G. Jilani, M. Arshad, Z. A. Zahir and A. Khalid. 2007b. Bio-conversion of organic waste for their recycling in agriculture and overview of perspective and prospects Annals of Microbiology, 57(4): 471-479.

Ahmad A. K., G. Jilani, M. S. Akhtar, S. M. S. Naqvi and M. Rasheed. 2009. Phosphorus Solubilizing Bacteria: Occurrence, Mechanisms and their Role in Crop Production. J. Agric. Biol. Cci. 1 (1):48-58

Alam, S. M., S. M. Shah and M. M. Iqbal. 2005. Evaluation of method and time of fertilizer application for yield and optimum P-efficiency in wheat. Songklanakarin J. Sci. Technol. 27: 457-463.

Aziz, T., Rahmatullah, M. A. Maqsood, M. A. Tahir, I. Ahmad and M. A. Cheema. 2006. Phosphorus utilization by six *brassica* cultivars (*Brassica juncea* L.) from tricalcium phosphate; a relatively insoluble P compound. Pakistan journal of botany 38(5); 1529-1538.

Bhattacharyya, P., K. Chakrabarti, A. Chakraborty, D. C. Nayak, S. Tripathy and M. A. Powell. 2007. Municipal waste compost as an alternative to cattle manure for supplying potassium to lowland rice. Chemosphere. 66: 1789-1793.

Bucio, J. L., A. C. Ramirez and L. H. Estrella. 2003. The role of nutrient availability in regulating root architecture. Current Opinion in Plant Biology, 6:280-287.

Caravaca, F., M. M. Alguacil, R. Azcon, G. Diaz and A. Roldan. 2004. Comparing the effectiveness of mycorrhizal inoculum and amendment with sugar beet, rock phosphate and *Aspergillusniger* to enhance field performance of the leguminous shrub *Dorycniumpentaphyllum* L. Appl. Soil Ecol., 25:169-180.

Dastager, S. G., C. K. Deepa and A. Pandey. 2010. Isolation and characterization of novel plant growth promoting *micrococcus* sp NII-0909 and its interaction with cowpea. Plant Physiol. Biochem., 48(12); 987-992

Dworkin M. and J. Foster. 1958. Experiments with some microorganisms which utilize ethane and hydrogen. J Bacteril 75: 592-601.

Gupta, A. and S. Sen. 2012. Role of biofertilizers and biopesticides for sustainable agriculture. Department of Biotechnology, Singhania University, Rajasthan Gyaneshwar, P., G. N. Kumar and L. J. Parkh. 1998. Effect of buffering on the phosphate solubilizing ability of microorganisms. World J. Microbial. Biotechnol. 14: 669-673.

Hamza, M. A. and W. K. Anderson. 2010. Potential and limitations of soil organic matter build-up in dry areas. African Journal of Agricultural Research Vol. 5(20), pp. 2850-2861, 18 October, 2010

Harris, J. N., P. B. New and P. M. Martin. 2006. Laboratory tests can predict beneficial effects of phosphate-solubilizing bacteria on plants. J. Soil Biol. & Bioch. 38: 1521-1526.

Kennedy, A. C. and K. L. Smith, 1995. Soil microbial diversity and the sustainability of agriculture soils. Plant Soil. 170: 75-86.

Mullins, G. 2009. Phosphorus, agriculture and the environment. Virginia Polytechnic Institute and State University. Publication 424-029.

Nautiyal, C. S. 1999. An efficient microbiological growth medium for screening phosphate solubilizing microorganisms. FEMS Microbiol. Lett. 170: 265-270.

Penrose D. M. and B. R. Glick. 2003. Methods for isolating and characterizing ACC deaminase-containing plant growth-promoting rhizobacteria. Physiol Plant 118: 10-15.

Ryan, J., G. Estefan and A. Rashid. 2001. Soil and Plant Analysis: Laboratory Manual. ICARDA, Aleppo.

Sachachtman, D. P., R. J. Rield and S. M. Ayling. 1998. Phosphorus uptake by plants from soil to cell. Plant physiology 116: 447-453.

Semedo, L. T. A. S., A. A. Linhares, R. C. Gomes, G. P. Manfio, C. S. Alviano, L. F. Linares and R. R. R. Coelho. 2001. Isolation and characterization of actinomycetes from Brazilian tropical soils. Microbiol. Res. 155: 291-299

Sekhar, D. M. R. and N. C. Aery. 2001. Phosphate rock with farmyard manure as P fertilizer in neutral and weakly alkaline soils. CURRENT SCIENCE. 80; 9-10.

Shahroona B., M. Naveed, M. Arshad and Z. A. Zahir. 2008. Fertilizer-dependent efficiency of Pseudomonads for improving growth, yield and nutrient use efficiency of wheat (*Triticum aestivum* L.). Appl Microbiol Biotechnol 79: 147-155.

Shahzad, S. M., A. Khalid, M. Arshad and K. Rehman. 2010. Screening rhizobacteria containing ACC-deaminase for growth promotion of chickpea seedlings under axenic conditions. Soil & Environ. 29(1): 38-46.

Shenoy, V., V. G. M. Kalagudi. 2005. Enhancing plant phosphorus use efficiency for sustainable cropping. J. Biotechnol. Adv. 23: 501-513.

Straaten, P. V. 2002. Rocks for Crops: Agrominerals of sub-Saharan Africa. ICRAF, Nairobi, Kenya, 338pp.

Takahashi, S. and M. Anwar. 2007. Wheat grain yield, phosphorus uptake and soil phosphorus fraction after 23 years of annual fertilizer application to an Andosol. J. Field Crops Res. 101: 160-171.

United Nations Environment Program (UNEP). 1996. Mineral Fertilizer Production and the Environment. Technical Report part 1.

Vance, C. P. 2001. Symbiotic nitrogen fixation and phosphorus acquisition: plant nutrition in a world of declining renewable resources. J. Plant Physiol. 127: 390-397.

Vance, C. P., C. Uhde-Stone and D. L. Allan. 2003. Phosphorus Acquisition and use: Critical adaptations by plants for securing a nonrenewable resources. New Phytol. 157: 423-447.

Vassilev, N and M Vassileva. 2003. Biotechnological solubilization of rock phosphate on media containing agro-industrial wastes. Appl Microbiol Biotechnol. 61:435-440

Walpola, B. C. and M. H. Yoon. 2012. Prospectus of phosphate solubilizing microorganisms and phosphorus availability in agricultural soils. African Journal of Microbiology Research Vol. 6(37), pp. 6600-6605

Williamson, L. C., S. P. C. P. Ribrioux, A. H. Fitter and H. M. O. Leyser. 2001. Phosphate Availability Regulates Root System Architecture in *Arabidopsis*. J. Plant Physiol. 126: 875-882.

World Bank Group Report. 2007. Environmental, health, and safety guidelines for Phosphate Fertilizer Manufacturing.

Zou, X., D. Binkley and K. Doxtader. 1992. A new method for estimating gross phosphorus mineralization and immobilization rates in soils. J. Plant Soil. 52: 147-152.

Zuberer, D. 1994. Recovery and Enumeration of Viable Bacteria. 8: 119-144.

What is claimed is:

1. A method of producing bioactive nutrient fortified fertilizer comprising the steps of:
providing a fertilizer;
providing a material having at least 60% of a target nutrient element;
preparing bioaugmented organic matter by:
  preparing organic matter;
  isolating element mobilizing microorganisms capable of mobilizing the target nutrient element;
  growing the element mobilizing microorganisms to prepare a culture;
  inoculating the organic matter with a portion of the culture; and
  incubating the inoculated organic matter to generate the bioaugmented organic matter having a predetermined population of the element mobilizing microorganisms;
preparing bioactive nutrient from the bioaugmented organic matter and the material having the target nutrient element; and
coating the fertilizer with the bioactive nutrient to form bioactive nutrient fortified fertilizer.

2. The method of claim 1 wherein the step of preparing bioactive nutrient includes the steps of:
blending the bioaugmented organic matter and the material having the target nutrient element; and
incubating the blend to generate the bioactive nutrient having a predetermined level of the target nutrient element in a combined organic fraction and water fraction.

3. The method of claim 2 wherein the level of the target nutrient element in the combined organic fraction and water fraction is greater than or equal to approximately 75% of the target nutrient element present in the material having the target nutrient element.

4. The method of claim 3 wherein the level of the target nutrient element in the combined organic fraction and water fraction is between approximately 75% and approximately 85% of the target nutrient element present in the material having the target nutrient element.

5. The method of claim 1 wherein the target nutrient element is an immobile element and includes at least one member of a group consisting of: phosphorus, zinc, boron, iron, copper, and manganese.

* * * * *